US008656012B2

(12) United States Patent
Nakajima

(10) Patent No.: US 8,656,012 B2
(45) Date of Patent: Feb. 18, 2014

(54) MANAGEMENT COMPUTER, STORAGE SYSTEM MANAGEMENT METHOD, AND STORAGE SYSTEM

(75) Inventor: Jun Nakajima, Yokohama (JP)

(73) Assignee: Hitachi, Ltd., Tokyo (JP)

(*) Notice: Subject to any disclaimer, the term of this patent is extended or adjusted under 35 U.S.C. 154(b) by 202 days.

(21) Appl. No.: 13/133,604

(22) PCT Filed: Mar. 8, 2011

(86) PCT No.: PCT/JP2011/055334
§ 371 (c)(1),
(2), (4) Date: Jun. 8, 2011

(87) PCT Pub. No.: WO2012/120634
PCT Pub. Date: Sep. 13, 2012

(65) Prior Publication Data
US 2012/0233316 A1  Sep. 13, 2012

(51) Int. Cl.
G06F 15/173 (2006.01)
G06F 15/177 (2006.01)

(52) U.S. Cl.
USPC ........................................ 709/224; 709/221

(58) Field of Classification Search
None
See application file for complete search history.

(56) References Cited

U.S. PATENT DOCUMENTS 5,796,633 A * 8/1998 Burgess et al. ............... 702/187
7,571,225 B2 * 8/2009 Devraj et al. ................. 709/223
8,046,764 B2 * 10/2011 Yamakabe et al. ........... 718/104
8,166,157 B2 * 4/2012 Couture et al. ............... 709/224
2002/0065864 A1 * 5/2002 Hartsell et al. ............... 709/100
2002/0083169 A1 * 6/2002 Aki et al. ...................... 709/224
2005/0119996 A1   6/2005 Ohata et al.
2009/0157699 A1   6/2009 Ohata et al.

FOREIGN PATENT DOCUMENTS

| JP | 2002-252614 | 9/2002 |
| JP | 2003-345620 | 12/2003 |
| JP | 2005-157933 | 6/2005 |
| JP | 2009-122820 | 6/2009 |
| JP | 2009-265785 | 11/2009 |
| JP | 4516306 | 5/2010 |
| WO | WO 2008/056682 A1 | 5/2008 |

OTHER PUBLICATIONS

PCT International Search Report and Written Opinion on application No. PCT/JP2011/055334 dated Jun. 21, 2011; 11 pages.

* cited by examiner

Primary Examiner — John B. Walsh
(74) Attorney, Agent, or Firm — Foley & Lardner LLP

(57) ABSTRACT

It is provided a management computer coupled to a plurality of storage apparatuses and a plurality of physical computers, which comprises a memory, a processor and a network interface. The management computer collects performance information on each of at least one resource included in a path based on monitoring priority assigned to the each of the at least one resource; identifies a first path including a first resource based on configuration information in a case where a first event has occurred on the first resource; identifies a second resource included in the first path; determines whether a third resource for which the monitoring priority needs to be changed is included in the second resource based on the first event and the monitoring priority information; and changes the monitoring priority of the third resource in a case where the third resource is determined to be included in the second resource.

15 Claims, 22 Drawing Sheets

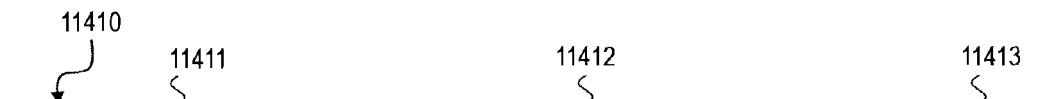

| MONITORING PRIORITY TYPE | | MONITORING PRIORITY | | | SETTING |
|---|---|---|---|---|---|
| | | HIGH | MIDDLE | LOW | |
| DEFAULT TYPE | INTERVAL | 5 MINUTES | 30 MINUTES | NOTHING | PREDEFINED |
| | ITEM | ALL | IMPORTANT | | |
| ACQUISITION ITEM ORIENTED TYPE | INTERVAL | 5 MINUTES | 30 MINUTES | NOTHING | PREDEFINED |
| | ITEM | ALL | | | |
| ACQUISITION INTERVAL ORIENTED TYPE | INTERVAL | 5 MINUTES | | NOTHING | PREDEFINED |
| | ITEM | ALL | IMPORTANT | | |
| TEST1 TYPE | INTERVAL | 1 MINUTE | 10 MINUTES | 60 MINUTES | USER DEFINED |
| | ITEM | ALL | ALL | IMPORTANT | |
| ... | INTERVAL | ... | ... | ... | USER DEFINED |
| | ITEM | | | | |

Fig. 5

| RULE | STATE FOR EACH MONITORING PRIORITY | | | RELEVANT RESOURCE TYPE | SETTING |
|---|---|---|---|---|---|
| | HIGH | MIDDLE | LOW | | |
| VIRTUAL SERVER POWER SUPPLY ON/OFF | ON | - | OFF | PHYSICAL SERVER/ VIRTUAL SERVER | PREDEFINED |
| | | | | SERVER DATA I/F | |
| | | | | STORAGE DATA I/F | |
| | | | | LOGICAL VOLUME | |
| | | | | PHYSICAL DISK | |
| VOLUME PATH SWITCHING | MAIN | SUB | - | SWITCH DATA I/F | PREDEFINED |
| | | | | STORAGE DATA I/F | |
| | | | | LOGICAL VOLUME | |
| | | | | PHYSICAL DISK | |
| | | | | VIRTUAL VOLUME | |
| I/O PATH FAILURE (REDUNDANCY CHANGE) | 1 | 2 | 3 or more | SERVER DATA I/F | PREDEFINED |
| | | | | SWITCH | |
| | | | | SWITCH DATA I/F | |
| | | | | STORAGE DATA I/F | |
| BUSINESS TASK APPLICATION TYPE CHANGE | DB | MAIL | WEB | ALL | USER DEFINED |
| ... | ... | ... | ... | ... | USER DEFINED |

Fig. 6

| | 11511 | 11512 | 11517 | 11513 | 11514 | 11515 | 11516 |
|---|---|---|---|---|---|---|---|
| 11510 | PHYSICAL SERVER | VIRTUAL SERVER | BUSINESS TASK APPLICATION | SERVER DATA I/F | STORAGE DATA I/F | LOGICAL VOLUME | PHYSICAL DISK |
| | PHYSICAL SERVER A | VIRTUAL SERVER A | DB | SERVER DATA I/F (S1) | STORAGE DATA I/F (P1) | LOGICAL VOLUME (LV1) | PHYSICAL DISK (PD1) |
| | | VIRTUAL SERVER B | MAIL | SERVER DATA I/F (S2) | STORAGE DATA I/F (P2) | LOGICAL VOLUME (LV2) | PHYSICAL DISK (PD2) |
| | PHYSICAL SERVER B | ... | ... | ... | ... | ... | ... |

*Fig. 7*

| MONITORING TARGET | MONITORING PRIORITY |
|---|---|
| PHYSICAL SERVER A | HIGH |
| PHYSICAL SERVER B | HIGH |
| PHYSICAL SERVER C | HIGH |
| ... | ... |
| VIRTUAL SERVER A | HIGH |
| VIRTUAL SERVER B | LOW |
| ... | ... |
| SERVER DATA I/F (S1) | HIGH |
| SERVER DATA I/F (S2) | LOW |
| ... | ... |
| STORAGE DATA I/F (P1) | HIGH |
| STORAGE DATA I/F (P2) | LOW |
| ... | ... |
| LOGICAL VOLUME (LV1) | HIGH |
| LOGICAL VOLUME (LV2) | LOW |
| ... | ... |
| PHYSICAL DISK (PD1) | HIGH |
| PHYSICAL DISK (PD2) | LOW |
| ... | ... |

Fig. 8

| STORAGE NAME | STORAGE DATA I/F | LOGICAL VOLUME | I/O RESPONSE TIME | PHYSICAL DISK | IOPS |
|---|---|---|---|---|---|
| A | P1 | LV1 | 0.8ms | PD1 | 15 |
| A | P1 | LV2 | 1.0ms | PD1 | 10 |
| ... | ... | ... | ... | ... | ... |

*Fig. 9*

| VOLUME IDENTIFIER | SERVER DATA I/F | SWITCH DATA I/F | STORAGE DATA I/F | VIRTUAL VOLUME | PHYSICAL DISK | PATH STATE |
|---|---|---|---|---|---|---|
| VOLUME 1 | DATA I/F S1 | DATA I/F R1 | DATA I/F R2 | DATA I/F A-P1 | VIRTUAL VOLUME VV1 | PHYSICAL DISK PD1 | MAIN |
| | | | DATA I/F R3 | DATA I/F B-P2 | VIRTUAL VOLUME VV2 | PHYSICAL DISK PD2 | SUB |
| ... | ... | ... | ... | ... | ... | ... | ... |

*Fig. 19*

MANAGEMENT COMPUTER, STORAGE SYSTEM MANAGEMENT METHOD, AND STORAGE SYSTEM

BACKGROUND

This invention relates to a management computer, and more particularly, to a management computer in a storage area network.

It is an important requirement to provide a user with performance information serving as an index for a system management task which is ever increasing in complexity. The performance information is provided to the user by performance monitoring software of individual companies.

On the other hand, as the scale of a storage system increases in recent years, the number of targets to be managed by the management server and the quantity of information to be processed by the management server are increasing. Therefore, it is difficult for the management server to collect all pieces of the performance information on requested timings in a large-scale and complex storage environment.

A conventionally used management method is a method of equally monitoring various resources in the storage system, and collecting information and information that is unnecessary or has a lower importance along with information having a higher importance in system monitoring. As a result, as the scale of the storage system becomes large, before the collection and processing of information have been completed, timing for the next collection and processing is reached. Then, timing for collecting important information generated on an important monitoring target is lost, and a risk leading to a delay in detecting a sign of a generation of a problem, analyzing a cause of a problem, and solving the causes of the problem increases.

As a result, in a large-scale storage area network (SAN), it is necessary to select targets from which the performance information is collected, thereby monitoring the targets (namely, collecting the performance information). JP 4516306 B2 discloses a technology for, based on performance information collected from monitoring targets, automatically adjusting coverage of the targets from which the information is to be collected, and the degree of the information collection.

The technology disclosed in JP 4516306 B2 is a technology for changing the coverage of the targets of the information collection, and the degree of the information collection, of the monitoring targets and other monitoring targets relating to those monitoring targets in terms of performance, based on the performance information on the monitoring targets. As a result, the coverage of the monitoring targets, and the degree of the monitoring are changed in the storage system.

According to the technology disclosed in JP 4516306 B2, the monitoring system focuses on monitoring the monitoring targets the performance of which is not in a steady state, and other monitoring targets affecting the monitoring targets the performance of which is not in a steady state, and decreases the quantity and the interval of collecting the performance information on the monitoring targets the performance of which is in a steady state. Then, the monitoring system disclosed in JP 4516306 B2 consequently can perform preferred monitoring in a case where the number of targets for monitoring the performance information becomes enormous.

SUMMARY

In contract to the proposed technology disclosed in JP 4516306 B2, there are many cases in which the importance of monitoring depends not on the performance information of a monitoring target but on configurations and settings of the storage system in the management of the storage system. However, the prior art cannot adapt to the storage system in which the importance of monitoring changes depending on the configurations and the settings.

Particularly the system becomes more complex as in examples in which the virtualization technology for servers, switches, and storages has been widely available in recent years and an environment in which virtual resources and physical resources coexist becomes common, and it is thus difficult for an administrator to grasp the difference in the importance of monitoring depending on the dynamic configurations and settings of the system.

It is therefore an object of this invention to provide a performance monitoring system for eliminating collection of performance information for which monitoring is not necessary, and collecting important performance information preferentially based on configurations and settings of a storage system. It is also an object of this invention to provide a performance monitoring system for quickly detecting generation and a sign of generation of, analyzing, and solving a problem on an important monitoring target.

A representative aspect of this invention is as follows. That is, there is provided a management computer coupled to a plurality of storage apparatuses and a plurality of physical computers coupled to each of the plurality of storage apparatuses. The management computer comprises: a memory for holding monitoring priority information including monitoring priority corresponding to an event occurring on a path between each of the plurality of physical computers and each of the plurality of storage apparatuses, and configuration information including information indicating at least one resource included in the path; a processor for referring to the monitoring priority information and the configuration information; and a network interface for receiving performance information on each of the at least one resource from the plurality of storage apparatuses or the plurality of physical computers. The management computer collects the performance information on the each of the at least one resource included in the path based on the monitoring priority assigned to the each of the at least one resource; identifies a first path including a first resource based on the configuration information in a case where a first event has occurred on the first resource; identifies a second resource included in the first path; determines whether a third resource for which the monitoring priority needs to be changed is included in the second resource based on the first event and the monitoring priority information; and changes the monitoring priority assigned to the third resource in a case where the third resource is determined to be included in the second resource. According to one embodiment of this invention, it is possible to quickly detect generation and a sign of generation of, to analyze, and to solve a problem on an important monitoring target.

BRIEF DESCRIPTION OF THE DRAWINGS

FIG. 5 is an explanatory diagram illustrating a monitoring priority type table stored in a monitoring priority information repository according to the first embodiment of this invention.

FIG. 6 is an explanatory diagram illustrating a monitoring priority rule table stored in the monitoring priority information repository according to the first embodiment of this invention.

FIG. 7 is an explanatory diagram illustrating a configuration information table stored in the configuration performance information repository according to the first embodiment of this invention.

FIG. 8 is an explanatory diagram illustrating a monitoring priority table stored in the monitoring priority information repository according to the first embodiment of this invention.

FIG. 9 is an explanatory diagram illustrating a performance information table stored in the configuration performance information repository according to the first embodiment of this invention.

FIG. 19 is an explanatory diagram illustrating an alternate path state table according to the second embodiment of this invention.

DETAILED DESCRIPTION OF THE PREFERRED EMBODIMENTS

A description is now given of embodiments of this invention by referring to drawings. It should be noted that this invention is not limited to detailed steps of processing described hereinafter, but any step of processing may be used as long as a result of each processing is the same.

Moreover, though information according to this invention is described using expressions such as "aaa table" in the following section, the information does not necessarily have a table structure, but may be represented by data structures such as a list, a DB, and a queue. Therefore, "aaa table" and the like may be referred to as "aaa information" in order to indicate that the information is independent of the data structure.

Further, though "program" is used as a subject to describe processing in the description hereinafter, the program is executed by a processor to perform defined processing using a memory and a communication port (communication control device). Accordingly, the description may be provided while the processor is used as the subject. Moreover, processing disclosed while a program is described as a subject may be processing executed by a computer such as a management server and an information processing device. Moreover, part of or the whole of the program may be implemented by dedicated hardware.

Moreover, various programs may be installed on each of computers by program distribution servers or computer-readable memory media.

Further, the management server according to this embodiment includes an input device and an output device as described later. The input device and the output device may be a display, a keyboard, and a pointer device, or other devices, for example. Moreover, a serial interface or an Ethernet interface may be used as an input/output device as an alternative to the input device and the output device, and input and display on the input/output devices may be substituted by coupling a computer for display including a display, a keyboard, or a pointer device to the interface, transmitting information for display to the computer for display, and receiving information for input from the computer for display, thereby performing display or receiving an input on the computer for display.

Hereinafter, in a case where the management server displays information for display, the management server is a management system, and the management server and the computer for display also constitute the management system. Moreover, the same processing as that of the management server may be realized by a plurality of computers for increasing a speed and reliability of the management processing, and the plurality of computers (including the computer for display in a case where the display is performed by the computer for display) constitute the management system in this case.

[First Embodiment]
A description is given of a configuration of a storage system including a storage area network (SAN) according to this invention.

Figure 1:
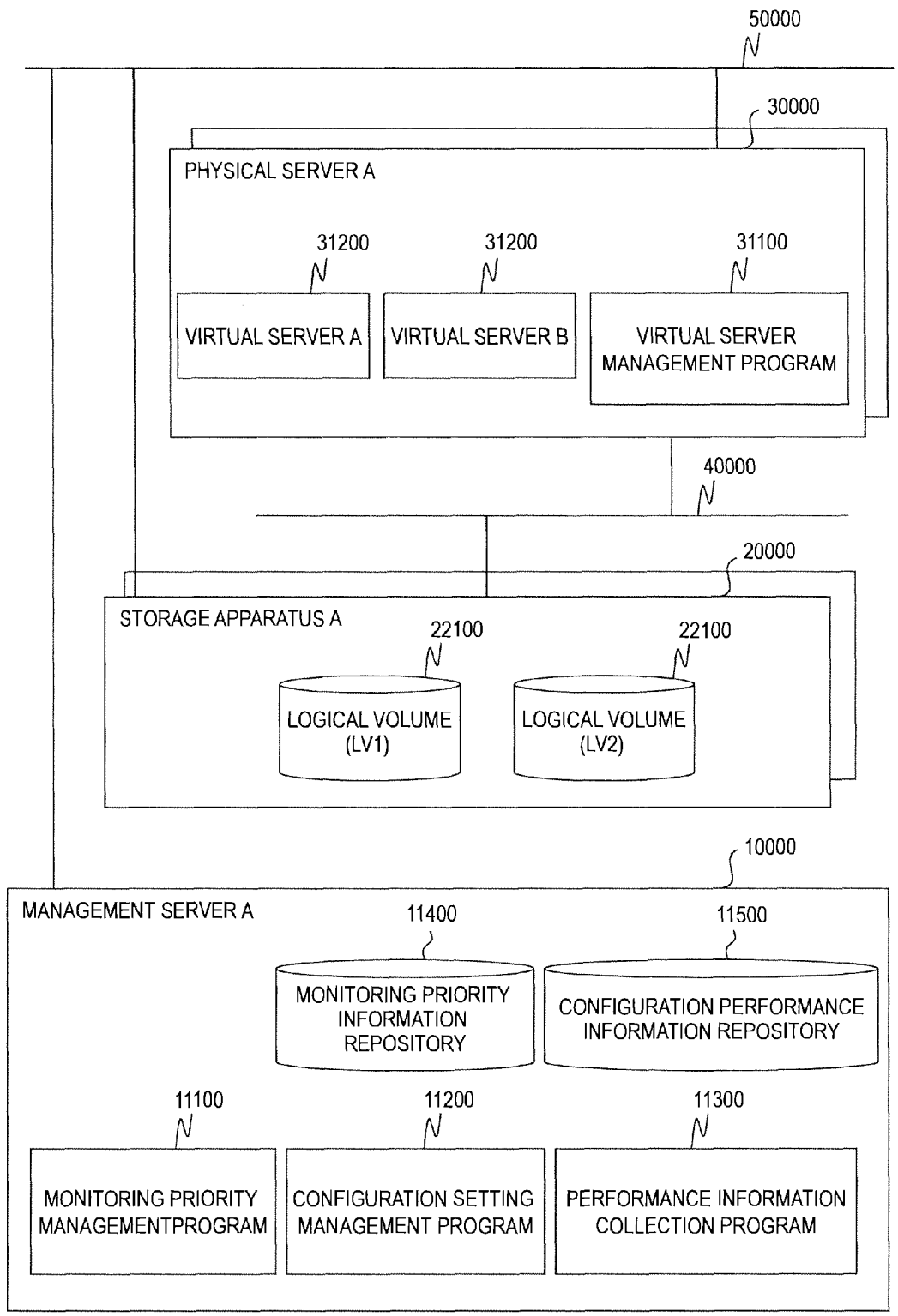
FIG. 1 is a block diagram illustrating a physical configuration of a storage system according to a first embodiment of this invention.

FIG. 1 is a block diagram illustrating a physical configuration of a storage system according to a first embodiment of this invention.

The storage system according to the embodiment of FIG. 1 includes a management server 10000, at least one storage apparatus 20000, and at least one physical server 30000.

The management server 10000 includes a monitoring priority management program 11100, a configuration setting management program 11200, and a performance information collection program 11300, includes a monitoring priority information repository 11400 and a configuration performance information repository 11500.

The monitoring priority management program 11100 is a program for giving an instruction to change a monitoring method based on a monitoring priority type table 11410 and a monitoring priority rule table 11420 described later, is a program for editing the monitoring priority type table 11410 and the monitoring priority rule table 11420.

The monitoring method according to this embodiment refers to a method of collecting, by the management server 10000, performance information from the storage apparatus or the physical server. Hereinafter, the method for collecting the performance information has the same meaning as the monitoring method.

Details of the processing of the monitoring priority management program 11100 are described later by referring to FIGS. 10, 11, and 12.

The configuration setting management program 11200 is a program for managing configuration information of each monitoring target by using a configuration information table 11510, is a program for managing a monitoring priority of a monitoring target by using a monitoring priority table 11430.

A detailed description is later given of the processing of the configuration setting management program 11200 by referring to FIG. 13.

Figure 14:
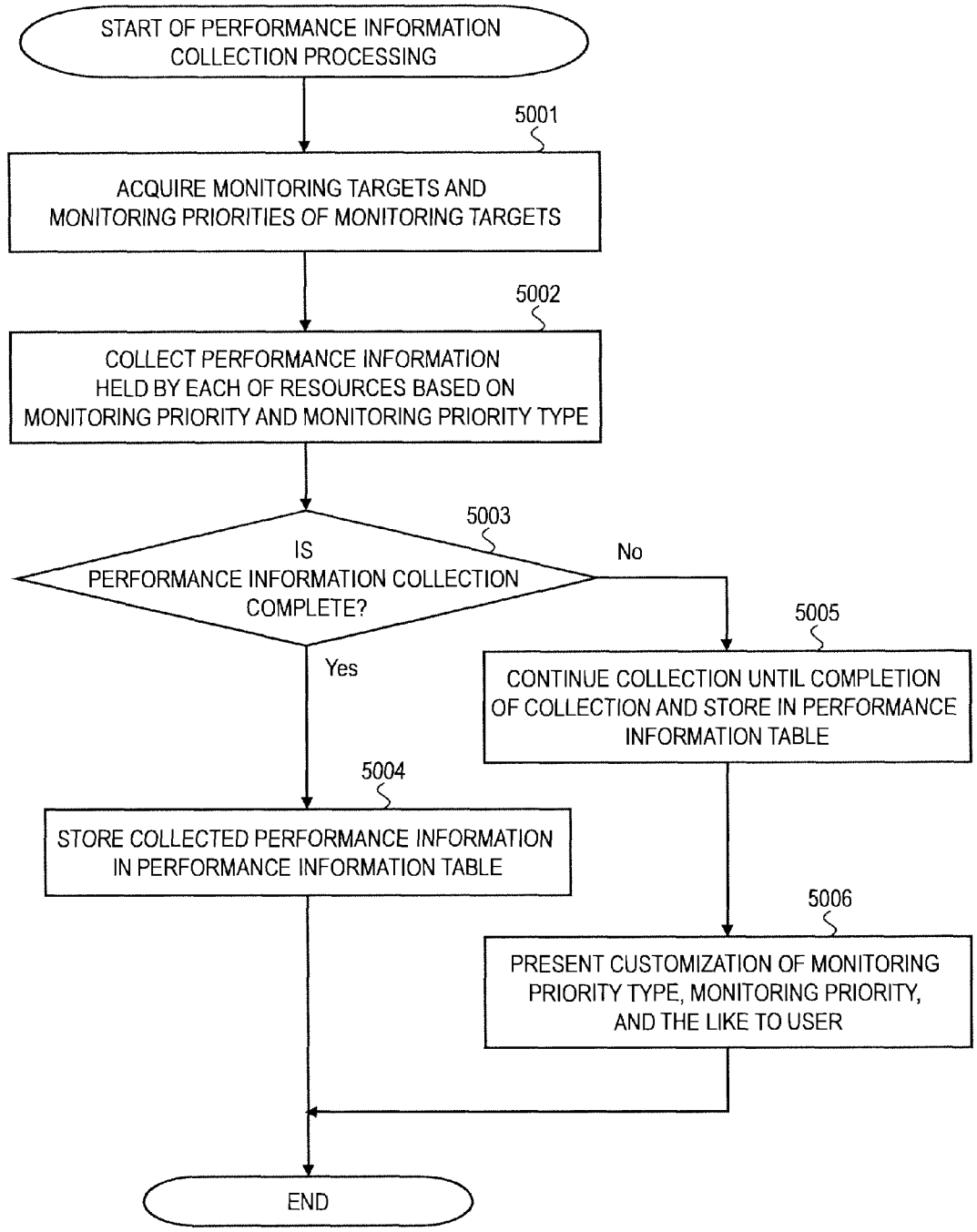
FIG. 14 is a flowchart illustrating performance information collection processing executed by the management server according to the first embodiment of this invention.

The performance information collection program 11300 is a program for collecting the performance information on each of the monitoring targets listed in the configuration information table 11510 based on a monitoring priority type included in the monitoring priority type table 11410, and information on monitoring priorities included in the monitoring priority table 11430, is a program for, in a case where the performance information cannot be collected as specified by the monitoring priority type, proposing a collection method for the performance information by processing illustrated in FIG. 14.

A detailed description is later given of the processing of the performance information collection program 11300 by referring to FIG. 14.

A plurality of logical volumes 22100 are generated on the storage apparatus 20000. Then, the generated logical volumes 22100 are provided to the physical server 30000. The storage apparatus 20000 (storage apparatus 2000A) illustrated in FIG. 1 provides the physical server 30000 (physical server 3000A) with logical volumes 22100 (LV1, LV2).

The physical server 30000 carries out various business tasks by using the logical volumes 22100 provided by the storage apparatus 20000. The physical server 30000 (physical server 3000A) and the storage apparatus 20000 (storage apparatus 20000A) illustrated in FIG. 1 are coupled to each other via a fibre channel 40000. Moreover, the physical server 30000 includes a virtual server management program 31100 and virtual servers 31200 (virtual server 31200A and virtual server 31200B).

The management server 10000, the storage apparatus 20000, and the physical server 30000 are coupled to each other via a management network 50000. The management server 10000 communicates with programs included in the storage apparatus 20000 and the physical server 30000 via the management network 50000.

Though the management server 10000 illustrated in FIG. 1 includes the monitoring priority management program 11100, the configuration setting management program 11200, and the performance information collection program 11300, this invention is not limited to this configuration. For example, the storage apparatus 20000 or the physical server 30000 may include the above-mentioned programs, or other devices such as switches (not shown) provided between each of the devices may include the above-mentioned programs.

Moreover, the coupling between the storage apparatus 20000 and the physical server 30000 is not limited to the direct coupling via the fibre channel 40000, and may be a coupling via network devices such as at least one fibre channel switch. Moreover, the coupling between the storage apparatus 20000 and the physical server 30000 may be a coupling via a network for data communication, such as a coupling via an IP network.

Figure 2:
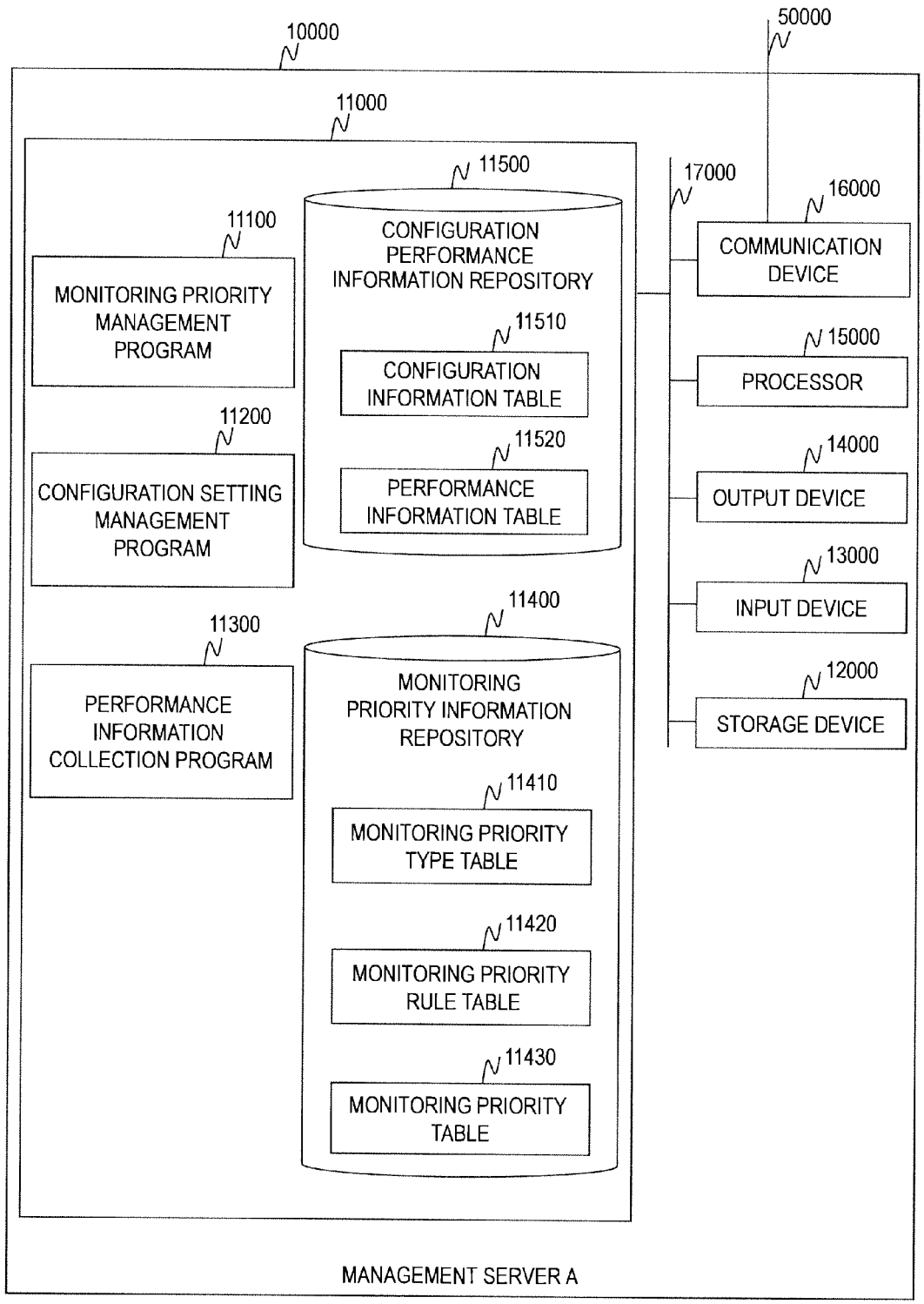
FIG. 2 is a block diagram illustrating a physical configuration of a management server according to the first embodiment of this invention.

FIG. 2 is a block diagram illustrating a physical configuration of the management server 10000 according to the first embodiment of this invention.

The management server 10000 includes a memory 11000, a storage device 12000, an input device 13000, an output device 14000, a processor 15000, and a communication device 16000. These devices and apparatuses are coupled to one another via a communication path 17000 such as an internal bus.

The memory 11000 stores the monitoring priority management program 11100, the configuration setting management program 11200, the performance information collection program 11300, the monitoring priority information repository 11400, and the configuration performance information repository 11500.

The monitoring priority information repository 11400 includes the monitoring priority type table 11410, the monitoring priority rule table 11420, and the monitoring priority table 11430, and the configuration performance information repository 11500 includes the configuration information table 11510, and a performance information table 11520.

The monitoring priority type table 11410 includes definitions of collection intervals and collection items according to the monitoring priority. The monitoring priority rule table 11420 includes definitions of events involving a change in the monitoring priority, types of resources whose priority is to be changed due to the event, and contents of the change in the priority. The monitoring priority table 11430 includes correspondences between a monitoring target and a monitoring priority of the each monitoring target.

The events according to this embodiment include a change in the configuration of the SAN configuration, a degradation of performance in each of resources included in the storage system, and a failure which has occurred to each of the resources. Information indicating that each of the events has occurred is acquired by the storage apparatus 20000 or the physical server 30000.

Moreover, the resources according to this embodiment include all devices and apparatuses and networks included in the storage system according to this embodiment. In other words, the resources refer to all devices, apparatuses and networks to be monitored by the management server 10000.

The configuration information table 11510 includes information indicating resources disposed on each of I/O paths. On this occasion, the I/O path according to this embodiment is a path from the physical server 30000 to a physical disk 22200 on which the logical volume 22100 used by the physical server 30000 is generated. The physical server 30000 transmits data to the logical volume 22100, and receives data from the logical volume 22100 via the I/O path.

The performance information table 11520 includes each of the monitoring targets and performance information on each of the monitoring targets in the storage system.

The storage device 12000 is an HDD or the like for storing information. The input device 13000 is a keyboard or the like used by a SAN administrator to input instructions to the monitoring priority management program 11100 and the like. The output device 14000 includes a display device or the like for outputting an input request used for transmitting an instruction to the monitoring priority management program 11100 to the administrator or the like.

The processor 15000 executes programs loaded on the memory 11000. The communication device 16000 is a device for coupling the management network 50000, the processor 15000 and the like to each other.

Though the programs and tables illustrated in FIG. 2 are stored in the memory 11000, the programs and tables may be stored in the storage device 12000 or other memory media (not shown). In a case where the programs and tables illustrated in FIG. 2 are stored in the storage device 12000 or other memory media (not shown), the processor 15000 reads out programs and tables into the memory 11000 when the programs are to be executed, and executes the programs which have been read out.

Moreover, the programs and tables illustrated in FIG. 2 may be stored in the memory of the storage apparatus 20000 or the memory of the physical server 30000, and the storage apparatus 20000 or the physical server 30000 may execute programs stored in its own memory. Moreover, other devices such as other servers (not shown) and switches (not shown) may include the programs and the tables illustrated in FIG. 2, and may execute the programs owned by themselves.

Figure 3:
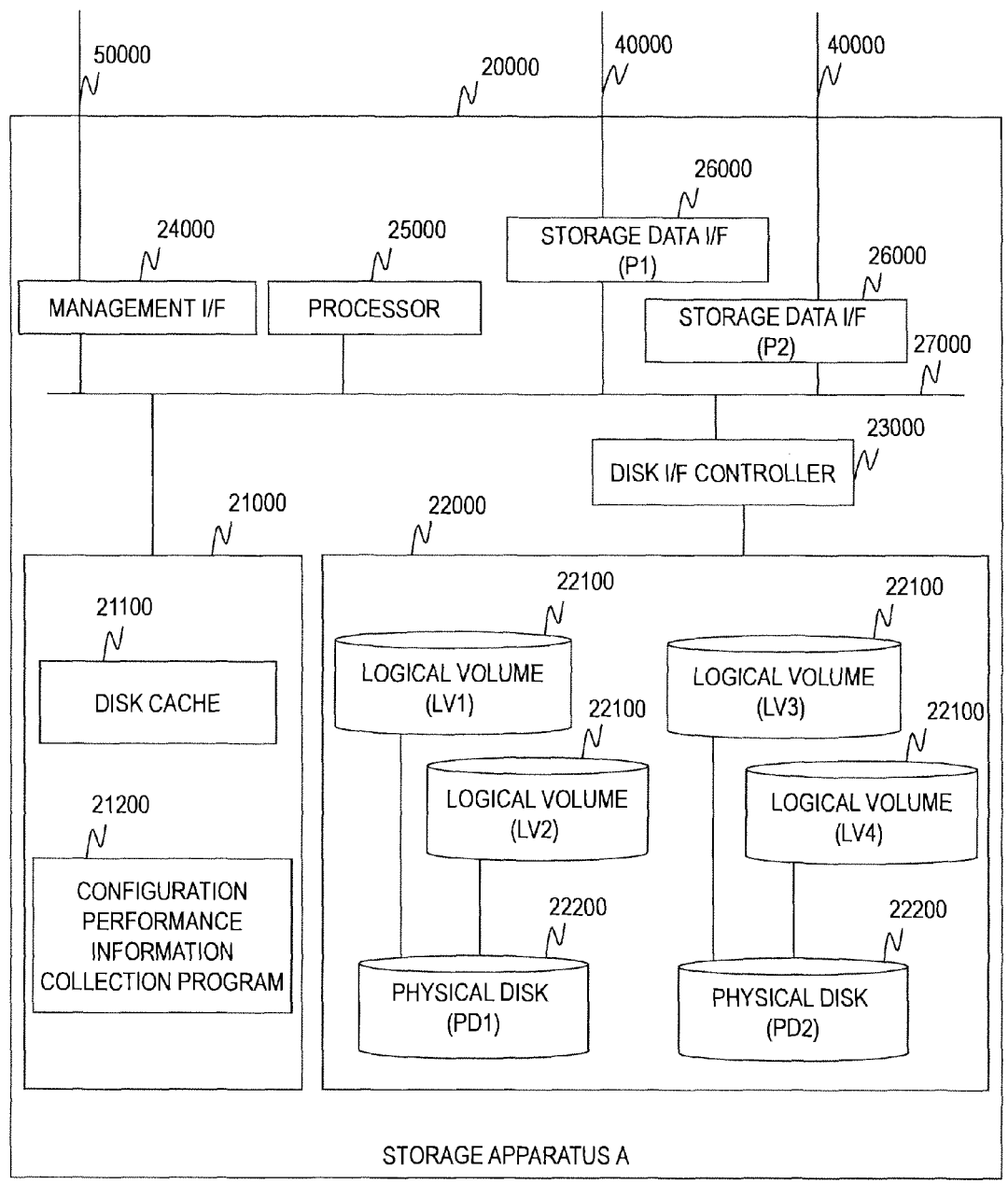
FIG. 3 is a block diagram illustrating a physical configuration of a storage apparatus according to the first embodiment of this invention.

FIG. 3 is a block diagram illustrating a physical configuration of the storage apparatus 20000 according to the first embodiment of this invention.

The storage apparatus 20000 includes a memory 21000, a logical volume providing section 22000, a disk I/F controller 23000, a management I/F 24000, a processor 25000, and storage data I/Fs 26000, and these devices are coupled to one another via a communication path 27000 such as an internal bus.

A disk cache 21100 and a configuration performance information collection program 21200 are stored in the memory 21000. The disk cache 21100 is a storage area for temporarily storing information.

The configuration performance collection program 21200 is a program for transmitting/receiving management information, performance information, and the like on the storage apparatus 20000 and the resources included in the storage apparatus 20000 between the storage apparatus 20000 and the management server 10000. Specifically, the configuration performance information collection program 21200 transmits changes in configuration, failures, and the like which have occurred in the storage apparatus 20000 to the management server 10000.

The logical volume providing section 22000 includes at least one physical disk 22200. The logical volume providing section 22000 then logically divides the storage area of the physical disk 22200, and provides the physical server 30000 and the like with the logically divided storage areas as the logical volumes 22100. As a result, the logical volume providing section 22000 enables devices other than the storage apparatus 20000 such as the physical server 30000 to make access to the logical volumes 22100.

It should be noted that a physical disk number is assigned to the physical disk 22200, and a logical volume number is assigned to the logical volume 22100. As a result, the storage apparatus 20000 can uniquely identify the respective physical disks 22200 and logical volumes 22100.

The logical volume providing section 22000 illustrated in FIG. 3 includes two physical disks 22200 (PD1 and PD2). The two physical disks 22200 (PD1 and PD2) are then respectively logically divided. Four logical volumes 22100 (LV1 to LV4) generated as a result of the division are then provided to devices (such as the physical server 30000) other than the storage apparatus 20000.

The disk I/F controller 23000 is an interface for coupling the logical volume providing section 22000 to the processor 25000 and the like. The management I/F 24000 is an interface for coupling the management network 50000 to the processor 25000 and the like. The processor 25000 executes programs loaded on the memory 21000.

The storage data I/F 26000 is an interface for coupling the fibre channel 40000 to the processor 25000 and the like. It should be noted that a plurality of disk I/F controllers 23000, the management I/Fs 24000, and the storage data I/Fs 26000 may be provided. The storage apparatus 20000 illustrated in FIG. 3 includes two storage I/Fs 26000 of a storage data I/F 26000 (P1) and a storage data I/F 26000 (P2).

Though the configuration performance information collection program 21200 illustrated in FIG. 3 is stored in the memory 21000, the program may be stored in another storage device (not shown) or another storage medium (not shown). In a case where the configuration performance information collection program 21200 is stored in another storage device or another storage medium, the processor 25000 reads the configuration performance collection program 21200 into the memory 21000 when the processing is executed, and executes the read program.

Moreover, the configuration performance information collection program 21200 may be stored in the memory of the management server 10000 or the memory of the physical server 30000, and the management server 10000 or the physical server 30000 may execute the configuration performance information collection program 21200 stored in its own memory. Moreover, the configuration performance information collection program 21200 may be stored in another storage apparatus 20000 (not shown), and the another storage apparatus 20000 may execute the configuration performance information collection program 21200 which is stored in itself.

Moreover, the logical volume providing section 22000 may logically divide a RAID group including a plurality of physical disks 22200, thereby creating logical volumes 22100. Moreover, the logical volume providing section 22000 may generate a logical volume 22100 by configuring an entire storage area of one physical disk 22200 as one logical volume 22100. Moreover, the logical volume providing section 22000 may produce logical volumes 22100 from storage areas of a storage medium such as a flash memory other than the physical disk 22200.

Figure 4:
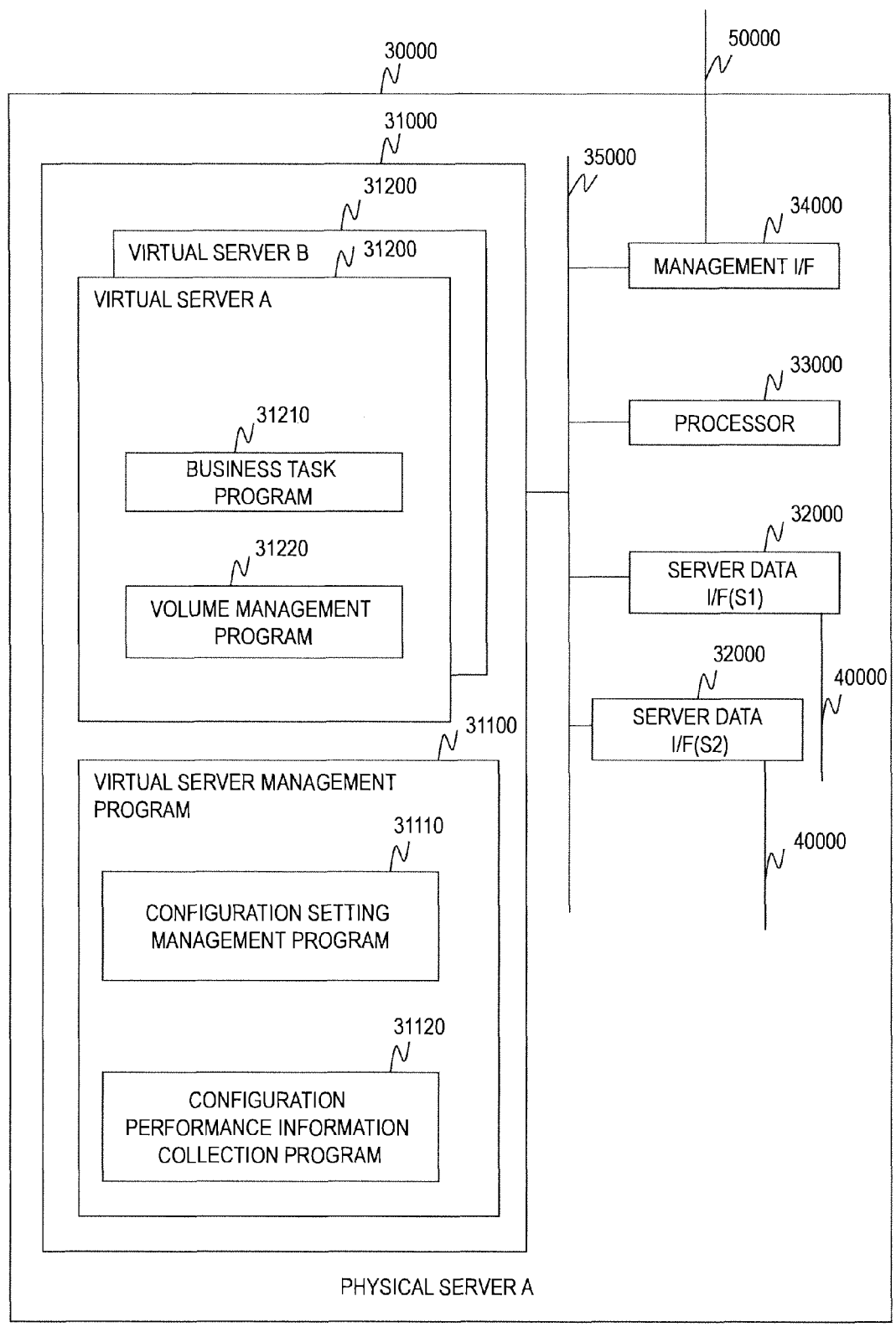
FIG. 4 is a block diagram illustrating a physical configuration of a physical server according to the first embodiment of this invention.

FIG. 4 is a block diagram illustrating a physical configuration of the physical server 30000 according to the first embodiment of this invention.

The physical server 30000 includes a memory 31000, server data I/Fs 32000, a processor 33000, and a management I/F 34000, and these devices are coupled to each other via a communication path 35000 such as an internal bus.

A virtual server management program 31100 and at least one virtual server 31200 are stored in the memory 31000. The virtual server management program 31100 includes a configuration setting management program 31110 and a configuration performance information collection program 31120.

The configuration setting management program 31110 manages communication processing, resource distribution processing, and the like among respective virtual servers 31200, the memory 31000, the server data I/Fs 32000, the processor 33000, and the management I/F 34000. In other words, the configuration setting management program 31110 is a program for realizing a virtual server mechanism.

The configuration performance information collection program 31120 collects management information and performance information on the physical server 30000 which includes the configuration performance information collection program 31120 itself, and collects management information and performance information on the respective virtual servers 31200 of the physical server 30000 which includes the configuration performance information collection program 31120 itself. Further, the configuration performance information collection program 31120 is a program which transmits and receives the collected management information and performance information between the physical server 30000 and the management server 10000.

Specifically, the configuration performance information collection program 31120 transmits changes in configuration, failures, and the like which have occurred in the physical server 30000 to the management server 10000.

The virtual server 31200 includes a business task program 31210 and a volume management program 31220. The business task program 31210 is a program for realizing business tasks executed by the virtual server 31200, and is a database management system (DBMS), a file system, or the like. The volume management program 31220 is a program used for allocating the logical volumes 22100 provided to the SAN to the virtual server 31200.

The virtual server 31200 uses the logical volumes 22100 allocated by the volume management program 31220 to perform a business task by the business task program 31210.

The server data I/F 32000 is an interface for coupling the fibre channel 40000 to the processor 33000 and the like. The processor 33000 executes programs loaded on the memory 31000. The management I/F 34000 is an interface for coupling the management network 50000 to the processor 33000 and the like.

It should be noted that a plurality of server data I/Fs 32000 and management I/Fs 34000 may be provided. Though the virtual server 31200 and the programs illustrated in FIG. 4 are stored in the memory 31000, the virtual server 31200 and the programs may be stored in another storage device (not shown) or another storage medium (not shown). In a case where the virtual server 31200 and the programs illustrated in FIG. 4 are stored in another storage device or another storage medium, the processor 33000 reads the virtual server 31200 and the programs into the memory 31000 when the processing is executed, and executes the read programs.

FIG. 5 is an explanatory diagram illustrating the monitoring priority type table 11410 stored in the monitoring priority information repository 11400 according to the first embodiment of this invention.

The monitoring priority type table 11410 stores the definitions of the collection intervals (intervals of time for collecting performance information) and collection items (contents of the performance information to be collected) according to the monitoring priority. A monitoring priority type 11411 necessary for a user is added to the monitoring priority type table 11410 by carrying out monitoring priority type setting processing of the monitoring priority management program 11100.

The monitoring priority type table 11410 includes the monitoring priority type 11411, a monitoring priority 11412, and a setting 11413. The monitoring priority type 11411 stores an identifier indicating a monitoring method (method of collecting the performance information, such as the collection interval and the collection item).

The monitoring priority 11412 stores, for each of priorities, values indicating the collection interval and the collection item for collecting the performance information from each of monitoring targets. The monitoring priority 11412 illustrated in FIG. 5 stores "HIGH", "MIDDLE", and "LOW" as the priorities.

"HIGH" of the monitoring priority 11412 illustrated in FIG. 5 is assigned to an important monitoring target, and indicates that the monitoring is performed preferentially. "LOW" is assigned to an unimportant monitoring target, and is monitored at a low priority. Moreover, "MIDDLE" is assigned to a monitoring target having its importance between "HIGH" and "LOW".

The setting 11413 stores an identifier indicating whether the monitoring priority type is a general monitoring priority type defined by the administrator or the like ("PREDEFINED" illustrated in FIG. 5) or a monitoring priority type generated as a result of definition by the user ("USER DEFINED" illustrated in FIG. 5).

Though the administrator and the user are described as different persons in this embodiment, the administrator and the user may be the same person.

According to the first embodiment, the monitoring priority type 11411 having the setting 11413 set as "PREDEFINED" include identifiers "DEFAULT TYPE", "ACQUISITION ITEM ORIENTED TYPE", and "ACQUISITION INTERVAL ORIENTED TYPE", and the monitoring priority type 11411 having the setting 11413 set as "USER DEFINED" includes "TEST1 TYPE".

According to the monitoring priority type table 11410 illustrated in FIG. 5, in a case where the monitoring priority type 11411 indicates "DEFAULT TYPE", the performance information collecting program 11300 collects entire performance information at a collection interval of five minutes from monitoring targets to which the monitoring priority 11412 is assigned "HIGH".

Moreover, in a case where the monitoring priority type 11411 indicates "DEFAULT TYPE", the monitoring priority type table 11410 indicates that the performance information collecting program 11300 collects only "IMPORTANT" performance information included in such items of monitoring targets as an event log or the like at a collection interval of thirty minutes from the monitoring targets to which the monitoring priority 11412 is assigned "MIDDLE". Moreover, in a case where the monitoring priority type 11411 indicates "DEFAULT TYPE", the monitoring priority type table 11410 indicates that the performance information collecting program 11300 collects none of the performance information from monitoring targets to which the monitoring priority 11412 is assigned "LOW".

Moreover, according to the monitoring priority type table 11410 illustrated in FIG. 5, the collection interval and the collection item for cases in which the monitoring priority type 11411 indicates "ACQUISITION ITEM ORIENTED TYPE", and the monitoring priority 11412 is "HIGH" and "LOW" are respectively the same as the collection interval and the collection item for the cases in which the monitoring priority type 11411 indicates "DEFAULT TYPE", and the monitoring priority 11412 is "HIGH" and "LOW". However, in a case in which the monitoring priority type 11411 indicates "ACQUISITION ITEM ORIENTED TYPE", the performance information collection program 11300 collects entire performance information at a collection interval of thirty minutes from monitoring targets to which the monitoring priority 11412 is assigned "MIDDLE".

In other words, "ACQUISITION ITEM ORIENTED TYPE" in the monitoring priority type 11411 is used in a case where more pieces of performance information need to be collected than "DEFAULT TYPE".

Further, according to the monitoring priority type table 11410 illustrated in FIG. 5, the collection interval and the collection item for cases in which the monitoring priority type 11411 indicates "ACQUISITION INTERVAL ORIENTED TYPE", and the monitoring priority 11412 is "HIGH" and "LOW" are respectively the same as the collection interval and the collection item for the cases in which the monitoring priority type 11411 indicates "DEFAULT TYPE", and the monitoring priority 11412 is "HIGH" and "LOW". However, in a case in which the monitoring priority type 11411 indicates "ACQUISITION INTERVAL ORIENTED TYPE", the performance information collection program 11300 collects only "IMPORTANT" performance information included in such items as an event log or the like at a collection interval of five minutes from monitoring targets to which the monitoring priority 11412 is assigned "MIDDLE".

In other words, "ACQUISITION INTERVAL ORIENTED TYPE" in the monitoring priority type 11411 is used in a case where performance information is to be collected at shorter time intervals than "DEFAULT TYPE".

Then, the monitoring priority type 11411 of "TEST1 TYPE" illustrated in FIG. 5 is a monitoring priority type generated by the user in a case where the user wants to set the collection interval and the collection item of each of the monitoring priorities 11412 to values other than the collection interval and the collection item of "DEFAULT TYPE", "ACQUISITION ITEM ORIENTED TYPE", and "ACQUISITION INTERVAL ORIENTED TYPE" of "PREDEFINED" as the setting 11413.

Each value of the collection interval and the collection item of the monitoring priority types 11411 having "PREDEFINED" and "USER DEFINED" may be any value other than values of the collection interval and the collection item illustrated in FIG. 5.

For example, the user may generate "TESTn type" (n is an arbitrary integer) as a monitoring priority type 11411. Then, ten minutes may be stored in the collection interval for "HIGH" in the monitoring priority 11412 and "ALL" may be stored in the collection item for "HIGH" included in a row of "TESTn TYPE". Moreover, twenty minutes may be stored in the collection interval, and "IMPORTANT" may be stored in the collection item for "MIDDLE" in the monitoring priority 11412 included in the row of "TESTn type", and "NOTHING" (no collection) may be stored in the collection interval and the collection item for "LOW".

Then, the user may store "PREDEFINED" or "USER DEFINED" in the setting 11413 for the generated "TESTn type".

Moreover, though the collection interval of the performance information and the collection item of the performance information are used in order to distinguish the monitoring priority types according to the first embodiment, this invention is not limited thereto. For example, the monitoring priority 11412 may be defined by protocols and the like for collecting the performance information.

Specifically, a value indicating that the performance information collection program 11300 collects the performance information from a monitoring target to which the monitoring priority 11412 is assigned "HIGH", via an original protocol provided by a vendor may be stored in the monitoring priority 11412, or a value indicating that the performance information collection program 11300 collects the performance information from a monitoring target to which the monitoring priority 11412 is assigned "MIDDLE" or "LOW", via a standard protocol such as the SMI-S I/F may be stored in the monitoring priority 11412. In other words, the monitoring priority 11412 may be determined by a protocol which affects the certainty, the performance, and the safety for collecting the performance information.

Moreover, though three monitoring priorities "HIGH", "MIDDLE", and "LOW" are stored in the monitoring priority 11412 according to the first embodiment, this invention is not limited thereto. Five levels of monitoring priority from 1 to 5 may be stored in the monitoring priority 11412, for example.

FIG. 6 is an explanatory diagram illustrating the monitoring priority rule table 11420 stored in the monitoring priority information repository 11400 according to the first embodiment of this invention.

The monitoring priority rule table 11420 stores definitions of states of monitoring targets a change of which results in a change in monitoring priority, types of resources the monitoring priority of which is changed as a result of the change in the state of the monitoring target, and contents of the changes. Records are added to the monitoring priority rule table 11420 by executing monitoring priority customization processing of the monitoring priority management program 11100.

The monitoring priority rule table 11420 includes rules 11421, states for each monitoring priority 11422, relevant resource types 11423, and settings 11424.

The rule 11421 stores an identifier indicating a state a change of which involves a change in the monitoring priority. When the state of a monitoring target is changed, a failure or an event of configuration change has occurred. A value stored in the rule 11421 is thus a value corresponding to an event to occur and the like.

The state for each monitoring priority 11422 stores a value indicating at which priority the monitoring target is monitored in the state of the monitoring target indicated by the rule 11421.

The relevant resource type 11423 stores types of resource which is affected in an operation state or the like according to the state of the monitoring target indicated by the rule 11421. For example, in a case where a power supply for the virtual server 31200A stops, types of resource which are affected in such a way as a stop of a function along with the virtual server 31200A are stored in the monitoring priority rule table 11420 illustrated in FIG. 6.

The setting 11424 stores an identifier which indicates whether the rule is a generic monitoring priority rule (PREDEFINED) defined by the user or the like in advance or a monitoring priority rule (USER DEFINED) generated according to a user definition.

A specific description is now given of the monitoring priority rule table 11420 illustrated in FIG. 6.

A row including an identifier indicating "VIRTUAL SERVER POWER SUPPLY ON/OFF" in the rule 11421 indicates that in a case where an event indicating that the power supply of the virtual server 31200 is turned on has occurred, namely, the virtual server 31200 is operating, resources indicated by the relevant resource type 11423 are to be monitored by a monitoring method for the monitoring priority "HIGH".

Moreover, in a case where an event indicating that the power supply of the virtual server 31200 is off, namely the virtual server 31200 is stopped, has occurred, the resources indicated by the relevant resource type 11423 are to be monitored by a monitoring method for the monitoring priority "LOW".

It should be noted that, although the identifier indicating "VIRTUAL SERVER POWER SUPPLY ON/OFF" is stored in the rule 11421 illustrated in FIG. 6, an identifier indicating whether the virtual server 31200 is in a state of operating (ON), a state of being stopped, or a state of being suspended may be stored. Moreover, "MIDDLE" or "LOW" of the state for each monitoring priority 11422 may store an identifier indicating the state of the suspension. In other words, the monitoring priority rule table 11420 may store any rule 11421 and any state for each monitoring priority 11422 according to the state of the virtual server 31200.

Moreover, a row including an identifier indicating "VOLUME PATH SWITCHING" in the rule 11421 indicates monitoring priorities for a configuration in which an I/O path from the physical server 30000 to the logical volume 22100 has an alternate path (SUB). Specifically, resources included on an I/O path (MAIN) actually used for writing, and indicated by the relevant resource type 11423 are monitored by the monitoring method for the monitoring priority "HIGH".

Moreover, in a case where an event of switching the I/O path to the alternate path (SUB) is generated, and the I/O path is changed from "MAIN" to "SUB", the resources indicated by the relevant resource type 11423 are to be monitored by the monitoring method for the monitoring priority "MIDDLE".

Moreover, a row including an identifier "I/O PATH FAILURE (REDUNDANCY CHANGE)" in the rule 11421 indicates monitoring priorities specified by a redundancy of an I/O path. Specifically, the row indicates that in a case where the redundancy of the I/O path is 1 (namely, a configuration in which a business task stops when a path failure has occurred), the resources indicated by the relevant resource type 11423 are to be monitored by the monitoring method for the monitoring priority "HIGH".

Moreover, the row indicates that in a case where the redundancy of the I/O path is 2 (namely, a configuration in which a business task does not stop when a path failure has occurred on one path), the resources indicated by the relevant resource type 11423 are to be monitored by the monitoring method for the monitoring priority "MIDDLE". Moreover, the row indicates that in a case where the redundancy of the I/O path is 3 (namely, a configuration in which a business task does not stop when path failures have occurred on two paths), the resources indicated by the relevant resource type 11423 are to be monitored by the monitoring method for the monitoring priority "LOW".

Moreover, a row including an identifier indicating "BUSINESS TASK APPLICATION TYPE CHANGE" in the rule 11421 indicates that the monitoring priority is assigned according to which application the business task program 31210 uses on the physical server 30000.

In a case where the business task program 31210 uses a "DATABASE (DB)" program in the monitoring priority rule table 11420 illustrated in FIG. 6, the resources indicated by the relevant resource type 11423 are monitored by the monitoring method for the monitoring priority "HIGH". Moreover, in a case where the business task program 31210 uses a "MAIL" program, the resources indicated by the relevant resource type 11423 are monitored by the monitoring method for the monitoring priority "MIDDLE". Moreover, in a case where the business task program 31210 uses a "WEB" program, the resources indicated by the relevant resource type 11423 are monitored by the monitoring method for the monitoring priority "LOW".

The monitoring priority rules of "PREDEFINED" include rows of "VIRTUAL SERVER POWER SUPPLY ON/OFF", "VOLUME PATH SWITCHING", and "I/O PATH FAILURE (REDUNDANCY CHANGE)" in the rule 11421, and the monitoring priority rule of "USER DEFINED" includes a row of "BUSINESS TASK APPLICATION TYPE CHANGE" in the rule 11421 according to the first embodiment. However, this invention is not limited to this example.

For example, a monitoring priority rule such as that for turning on/off the physical server 30000, the switch, or the storage apparatus 20000 may be defined in advance by the administrator or the like as a monitoring priority rule of "PREDEFINED", or may be newly generated by the user as a monitoring priority rule of "USER DEFINED".

Devices such as the physical server 30000, the switch, and the storage apparatus 20000 are integrated into a unit, and the number of provided units are increased or decreased in a recent environment. As a result, a case in which monitoring is not necessary in any one of layers of the physical server 30000, the switch, and the storage apparatus 20000 has occurred.

In a case where the scale units are added due to a lack in capacity, for example, there is a case in which the physical servers 30000 and the switches which are not used (turned off) are present in the added scale units, and a large number of monitoring targets for which the monitoring is not necessary are present. The monitoring can be performed for proper monitoring targets by the user or the like changing the resources included in the relevant resource type 11423 in this case.

The relevant resource type 11423 illustrated in FIG. 6 includes the physical server 30000, the switch, the storage apparatus 20000, the data I/F, the logical volume, and the physical disk, but this invention is not limited to these resources.

It should be noted that the management server 10000 may receive an event corresponding to the rule 11421 transmitted from the storage apparatus 20000, the physical server 30000, or the like, or may acquire configuration information accumulated in the storage apparatus 20000, the physical server 30000, or the like as an event according to this embodiment as described later.

FIG. 7 is an explanatory diagram illustrating the configuration information table 11510 stored in the configuration performance information repository 11500 according to the first embodiment of this invention.

The configuration information table 11510 stores information on resources included in a path between the physical server 30000 and the physical disk 22200 on which the logical volume 22100 provided to the physical server 30000 is generated. In a case where the physical server 30000 makes access to the logical volume 22100, the physical server 30000 communicates with the logical volume 22100 via the resources stored in the configuration information table 11510. Records are added to the configuration information table 11510 by executing the configuration setting management program 11200.

The configuration information table 11510 includes physical servers 11511, virtual servers 11512, business task applications 11517, server data I/Fs 11513, storage data I/Fs 11514, logical volumes 11515, and physical disks 11516. The resources stored in the configuration information table 11510 belong to any one of the respective types indicated by the relevant source types 11423 in the monitoring priority rule table 11420.

The physical server 11511 stores an identifier for uniquely identifying a physical server 30000. The virtual server 11512 stores an identifier for uniquely identifying a virtual server 31200. The business task application 11517 stores an identifier for uniquely indicating an application of the business task program 31210 used by the virtual server 31200.

The server data I/F 11513 stores an identifier for uniquely identifying a server data I/F 32000 which communication transmitted from the physical server 30000 routes when the physical server 30000 makes access to a logical volume 22100 indicated by the logical volume 11515.

The storage data I/F 11514 stores an identifier for uniquely identifying a storage data I/F 26000 which communication transmitted from the physical server 30000 routes when the physical server 30000 makes access to the logical volume 22100 indicated by the logical volume 11515.

The logical volume 11515 stores an identifier for uniquely identifying the logical volume 22100. The physical disk 11516 stores an identifier for uniquely identifying a physical disk 22200 on which the logical volume 22100 indicated by the logical volume 11515 is generated.

Though the configuration information table 11510 according to the first embodiment stores, as the resources for routing the physical servers 30000, the virtual servers 31200, the server data I/Fs 32000, the storage data I/Fs 26000, the logical volumes 22100, and the physical disks 22200, the configuration information table 11510 according to this invention is not limited thereto.

For example, the configuration information table 11510 according to this invention may store information such as identifiers indicating a switch, a switch data I/F, and the like, may store information such as an identifier indicating the business task program 31210 (such as a database management system (DBMS) on the physical server 30000, and information indicating relationships with a snapshot volume for storing snapshots of the virtual server 31200 and a clone volume for storing clones.

Moreover, the configuration information table 11510 illustrated in FIG. 7 includes a single path from the physical server 30000 to each of the physical disks 22200, but may include a plurality of paths. For example, the configuration information table 11510 may include an I/O path from the virtual server 31200A to the physical disk 22200 (PD1) and an I/O path from the virtual server 31200A to the physical disk 22200 (PD2).

Moreover, the configuration information table 11510 according to this invention may hold history information on operations executed for managing the configuration of the storage system according to this invention, and may hold detailed log information indicating operations of the system according to this invention by cooperating with a Syslog server and the like.

FIG. 8 is an explanatory diagram illustrating the monitoring priority table 11430 stored in the monitoring priority information repository 11400 according to the first embodiment of this invention.

The monitoring priority table 11430 stores resources to be monitored and monitoring priorities of these resources. Records are added to the monitoring priority table 11430 and the monitoring priority table 11430 is updated by carrying out monitoring priority table change processing of the configuration setting management program 11200.

The monitoring priority table 11430 includes monitoring targets 11431 and monitoring priorities 11432.

The monitoring target 11431 stores an identifier for uniquely identifying a resource to be monitored. The monitoring priority 11432 stores information such as a value indicating the monitoring priority of each of the monitoring targets. The monitoring priority 11432 stores the values such as the monitoring priorities illustrated in FIGS. 5 and 6, that is, "HIGH", "MIDDLE", and "LOW".

According to the first embodiment, the physical servers 30000 (A, B, and C), the virtual server 31200A, the server data I/F 32000 (S1), the storage data I/F 26000 (P1), the logical volume 22100 (LV1), and the physical disk 22200 (PD1) are present on a path through which a write from the virtual server 31200A is performed. The virtual server 31200A is then operating according to the first embodiment. "HIGH" is thus stored in the monitoring priority 11432 of the monitoring targets 11431 corresponding to these resources.

On the other hand, the virtual server 31200B, the server data I/F 32000 (S2), the storage data I/F 26000 (P2), the logical volume 22100 (LV2), and the physical disk 22200 (PD2) are present on an access path through which a write from the virtual server 31200B is performed. The virtual server 31200B is then stopped according to the first embodiment. It is thus not necessary to collect performance information from the virtual server 31200B, and hence "LOW" is stored in the monitoring priority 11432 of the monitoring targets 11431 corresponding to these resources.

The identifiers of the resources to be stored in the monitoring targets 11431 of FIG. 8 correspond to the identifiers of the resources to be stored in the configuration information table 11510 of FIG. 7.

FIG. 9 is an explanatory diagram illustrating the performance information table 11520 stored in the configuration performance information repository 11500 according to the first embodiment of this invention.

The performance information table 11520 stores performance information on SAN components such as the logical volumes 22100 and the physical disks 22200 included in each of the storage apparatuses 20000. As a result of execution of the performance information collection program 11300, records are added to the performance information table 11520.

The performance information table 11520 stores storage names 11521, storage data I/Fs 11522, logical volumes 11523, I/O response times 11524, physical disks 11525, and IOPerSeconds (IOPSs) 11526.

The storage name 11521 stores an identifier for uniquely identifying a storage apparatus 20000. The storage data I/F 11522 stores an identifier for uniquely identifying a storage data I/F.

The logical volume 11523 stores an identifier for uniquely identifying the logical volume 22100 on the storage apparatus 20000. The I/O response time 11524 stores an I/O response time extending from a time when the physical server 30000 transmits an I/O request to a time when the logical volume 11523 responds to the physical server 30000.

The physical disk 11525 stores an identifier for uniquely identifying the physical disk 22200 on the storage apparatus 20000. The IOPS 11526 stores the number of I/Os per unit time (one second according to the first embodiment) directed to the logical volume 22100 or the physical disk 22200.

Though the performance information table 11520 according to the first embodiment includes the I/O response times 11524 and the IOPSs 11526 as the performance information on the resources, the performance information table 11520 may include performance information such as ReadIOPerSecond, WriteIOPerSecond, a transfer rate, and a throughput. Moreover, though the performance information table 11520 illustrated in FIG. 9 includes the storage names 11521, the storage data I/Fs 11522, the logical volumes 11523, and the physical disks 11525 as the monitoring target resources, this invention is not limited thereto.

A description is now given of each management processing executed by the management server 10000.

Figure 10:
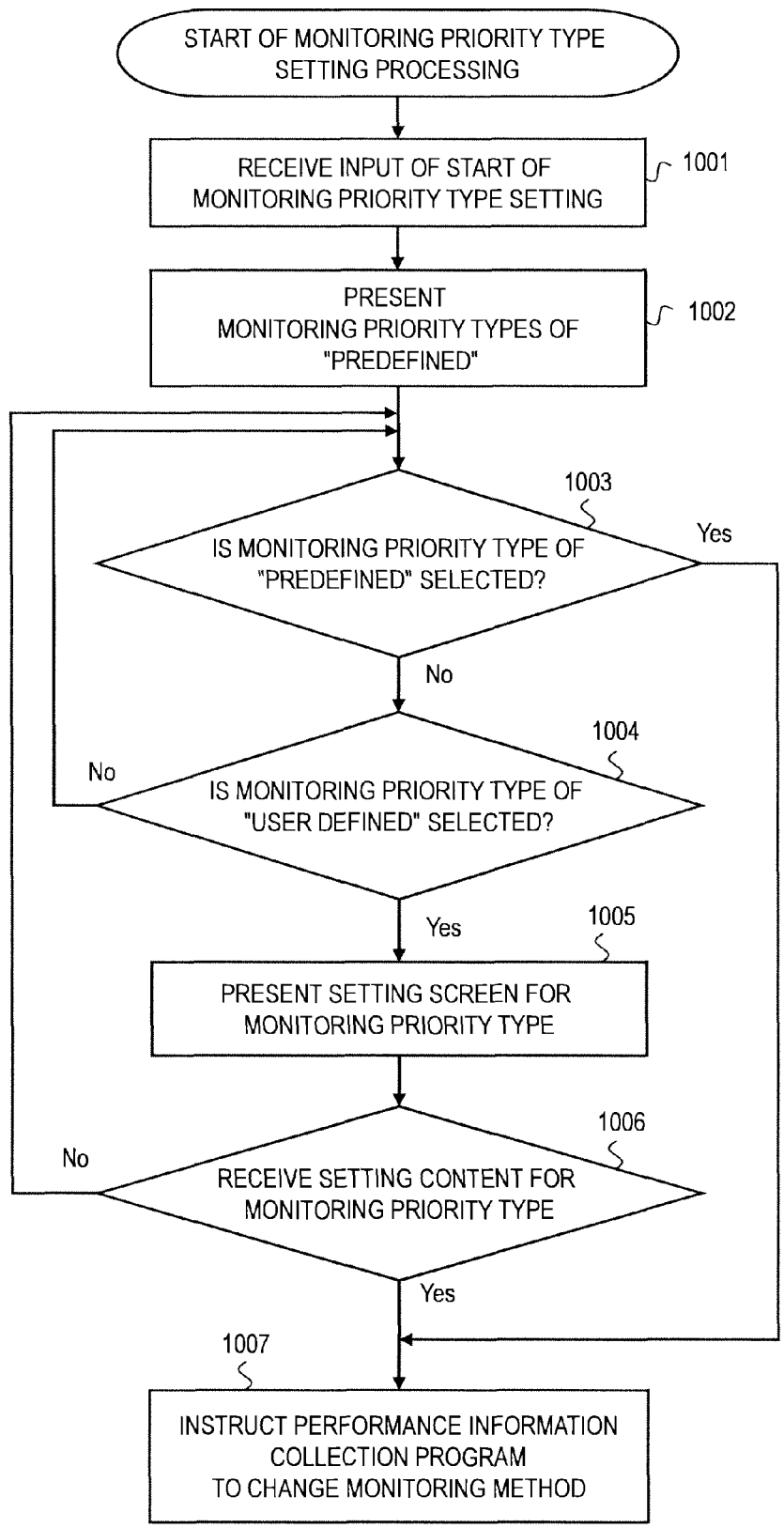
FIG. 10 is a flowchart illustrating a monitoring priority type setting processing executed by the management server according to the first embodiment of this invention.

FIG. 10 is a flowchart illustrating the monitoring priority type setting processing executed by the management server 10000 according to the first embodiment of this invention.

The monitoring priority type setting processing illustrated in FIG. 10 is executed by the processor 15000 of the management server 10000 executing the monitoring priority management program 11100 loaded on the memory 11000.

First, the monitoring priority management program 11100 receives an input indicating a start of setting the monitoring priority types 11411 (start of monitoring priority type setting) via the input device 13000 provided to the management server 10000 (Step 1001).

On this occasion, the monitoring priority management program 11100 displays a setting start button on the output device 14000 in order to receive the input indicating the start of setting the monitoring priority types, or automatically generates an input indicating the start of setting the monitoring priority types when another management program starts.

After Step 1001, the monitoring priority management program 11100 presents the information in the monitoring priority type table 11410 illustrated in FIG. 5 to the user by controlling the output device 14000 to output the information (Step 1002).

A description is now given of an example in which the output device 14000 is a display in the following section. The output device 14000 is not limited to a display, but may be a printer or the like. Moreover, the monitoring priority management program 11100 receives an input from a user via the input device 13000 in the following section.

The monitoring priority type table 11410 stores only monitoring priority types 11411 of "PREDEFINED" as the setting 11413 at initialization of the monitoring priority type table 11410, and the monitoring priority management program 11100 thus displays only information on the monitoring priority types 11411 of "PREDEFINED" as the setting 11413 on the display of the output device 14000 thereby presenting the information to the user.

After Step 1002, the monitoring priority management program 11100 determines whether an input indicating that the user selects any one of the monitoring priority types 11411 of "PREDEFINED" as the setting 11413 is received as a result of the display of the monitoring priority type table 11410 in Step 1002 (Step 1003).

In a case where an input indicating that the user selects any one of the monitoring priority types 11411 of "PREDEFINED" as the setting 11413 is received, the user determines to monitor the entire storage system according to this embodiment at the monitoring priority 11412 of the selected monitoring priority type 11411. Therefore, the monitoring priority management program 11100 instructs the performance information collection program 11300 to change the monitoring method in order to monitor the entire storage system according to this embodiment at the monitoring priority 11412 of the monitoring priority type 11411 selected by the user according to the received input (Step 1007).

In a case where an input indicating that the user selects the monitoring priority type 11411 of "PREDEFINED" as the setting 11413 is not received in a predetermined period, for example, the user determines not to monitor the storage system according to this embodiment using the monitoring priority type 11411 of "PREDEFINED" as the setting 11413. Therefore, the monitoring priority management program 11100 proceeds to Step 1004.

After Step 1003, in Step 1004, the monitoring priority management program 11100 determines whether an input indicating that the user selects any one of monitoring priority types 11411 of "USER DEFINED" as the setting 11413 is received on the monitoring priority type presentation screen (Step 1004).

Specifically, in Step 1004, the monitoring priority management program 11100 determines whether an input indicating change of an existing monitoring priority type 11411 of "USER DEFINED" or an input indicating generation of a new monitoring priority type 11411 is received.

In a case where an input indicating that the user selects a monitoring priority type 11411 of "USER DEFINED" as the setting 11413 is not received in a predetermined period, for example, the user determines that the monitoring priority types 11411 of "USER DEFINED" do not need to be changed. As a result, the monitoring priority management program 11100 returns to Step 1003, and waits for an input from the user.

In a case where an input indicating that the user selects a monitoring priority type 11411 of "USER DEFINED" as the setting 11413 is received, the user determines to change or to newly generate the selected monitoring priority 11412 of "USER DEFINED". Therefore, the monitoring priority management program 11100 presents a screen for changing or newly generating the monitoring priority 11412 of the selected monitoring priority type 11411 of "USER DEFINED", via the display of the output device 14000 (Step 1005).

After Step 1005, the monitoring priority management program 11100 determines whether a changed or newly generated monitoring priority 11412 of the monitoring priority type 11411 of "USER DEFINED" is received (Step 1006). In a case where a changed or newly generated monitoring priority 11412 is not received in a predetermined period, for example, the user determines that the monitoring priority 11412 of the presented monitoring priority type 11411 does not need to be changed or generated. As a result, the monitoring priority management program 11100 returns to Step 1003, and waits for an input from the user.

In a case where a changed or newly generated monitoring priority 11412 is received, the monitoring priority management program 11100 instructs the performance information collection program 11300 to change the monitoring method according to the received monitoring priority 11412 (Step 1007).

By the monitoring priority type setting processing described above, the monitoring priority management program 11100 determines the monitoring priority type 11411 to be used for the entire system. Moreover, the monitoring priority management program 11100 generates a monitoring priority type 11411 of "USER DEFINED" as necessary, and adds a record to the monitoring priority type table 11410.

Figure 11:
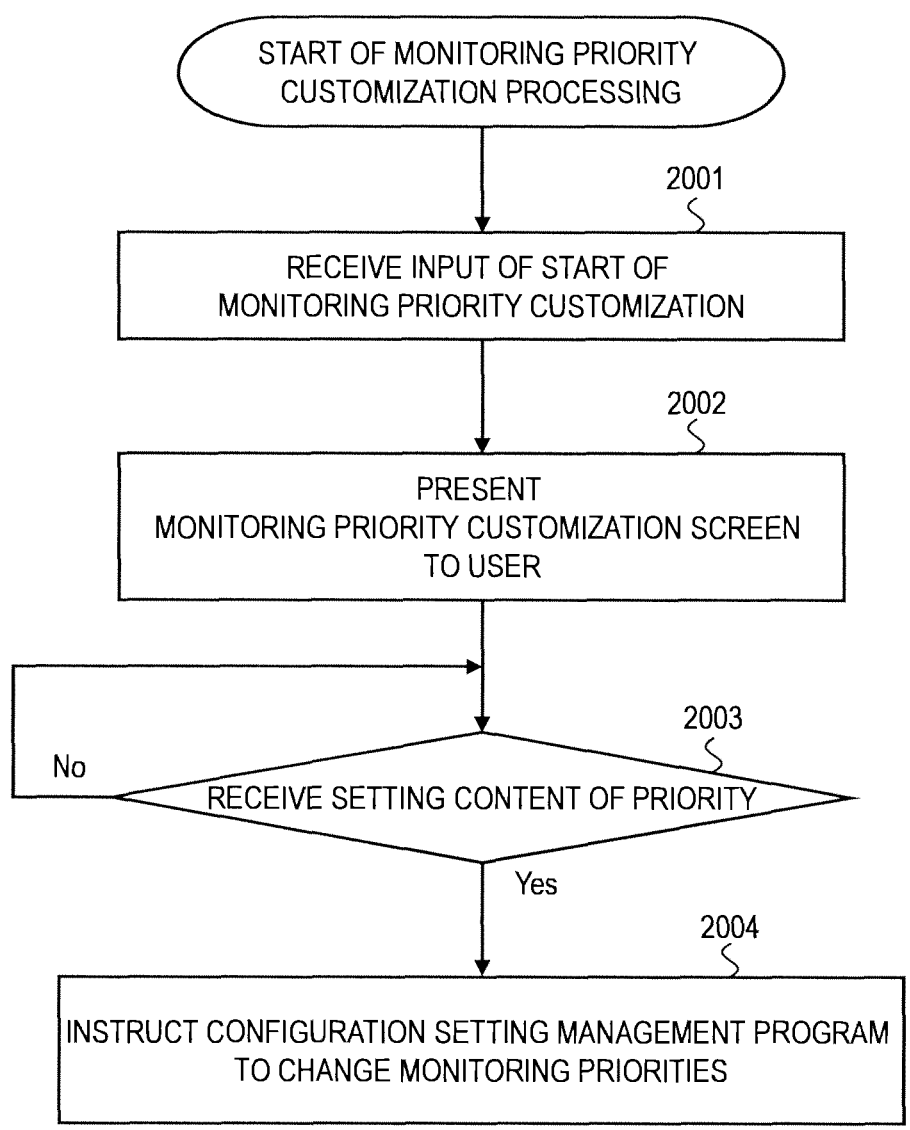
FIG. 11 is a flowchart illustrating a monitoring priority customization processing executed by the management server according to the first embodiment of this invention.

FIG. 11 is a flowchart illustrating the monitoring priority customization processing executed by the management server 10000 according to the first embodiment of this invention.

The monitoring priority customization processing is executed by the processor 15000 of the management server 10000 executing the monitoring priority management program 11100 loaded on the memory 11000.

The monitoring priority management program 11100 first receives an input indicating a start of customizing a monitoring priority 11412 (start of monitoring priority customization) from the user or the like (Step 2001).

After Step 2001, the monitoring priority management program 11100 presents a customization screen for each of the records included in the monitoring priority rule table 11420 illustrated in FIG. 6, and for adding a new monitoring priority rule (corresponding to a new record to be added to the monitoring priority rule table 11320) to the user (Step 2002).

The screen presented to the user in Step 2002 is referred to as monitoring priority rule presenting screen hereinafter.

After Step 2002, the monitoring priority management program 11100 determines whether an input of a setting content of the priority in response to the monitoring priority rule presenting screen is received (Step 2003).

In Step 2003, the user inputs a changed value to be stored in the state for each monitoring priority 11422 or the relevant resource type 11423 of a monitoring priority rule of "USER DEFINED" as the setting 11424, for example, to the input device 13000 of the management server 10000. Moreover, the user generates a new record of the monitoring priority rule table 11420 including new values of the rule 11421, the state for each monitoring priority 11422, and the relevant resource type 11423, for example, and inputs the generated record to the input device 13000 of the management server 10000.

It should be noted that, in Step 2003, the user may input a state corresponding to a rule 11421 of a changed or added monitoring priority rule in the input device 13000. This is for transmitting what monitoring priority 11432 the changed or added monitoring priority rule indicates, to the monitoring priority management program 11100 when the user inputs the monitoring priority rule.

In Step 2003, the monitoring priority management program 11100 determines whether the above-mentioned input is received from the user. In a case where an input is not received from the user in a predetermined period, for example, in Step 2003, the monitoring priority management program 11100 returns to Step 2003 and waits until an input is received from the user.

In a case where an input is received from the user in Step 2003, the monitoring priority management program 11100 transmits a request (monitoring priority change request) to instruct the configuration setting management program 31110 to change the monitoring priorities 11432 of the monitoring priority table 11430 according to the received input (Step 2004). The monitoring priority change request includes values indicating monitoring targets for changing the monitoring priority 11432.

Specifically, in Step 2003, the monitoring priority management program 11100 refers to the input from the user, and identifies the relevant resource type 11423 of the changed or added monitoring priority rule. Moreover, the monitoring priority management program 11100 refers to the input from the user, and identifies a state (or event) corresponding to the rule 11421. The monitoring priority management program 11100 determines the monitoring priority of each of the resources in the relevant resource type 11423 from the state for each monitoring priority 11422 based on the identified relevant resource type 11423 and state corresponding to the rule 11421.

Then, in Step 2003, the monitoring priority management program 11100 refers to the configuration information table 11510 of FIG. 7, and identifies all resources corresponding to the relevant resource type 11423. The monitoring priority management program 11100 then stores the identifiers corresponding to the resources identified from the configuration information table 11510 and the monitoring priorities determined based on the monitoring priority rule table 11420 in the monitoring priority change request.

By the above-mentioned monitoring priority customization processing, a new monitoring priority rule is added. The configuration setting management program 11200 is then called to execute processing (monitoring priority table change processing) of changing the monitoring priorities 11432 of the resources each corresponding to the relevant resource type 11423 according to the added monitoring priority rule. Moreover, a monitoring priority rule of "USER DEFINED" is newly added, and a record is added to the monitoring priority rule table 11420.

Figure 12:
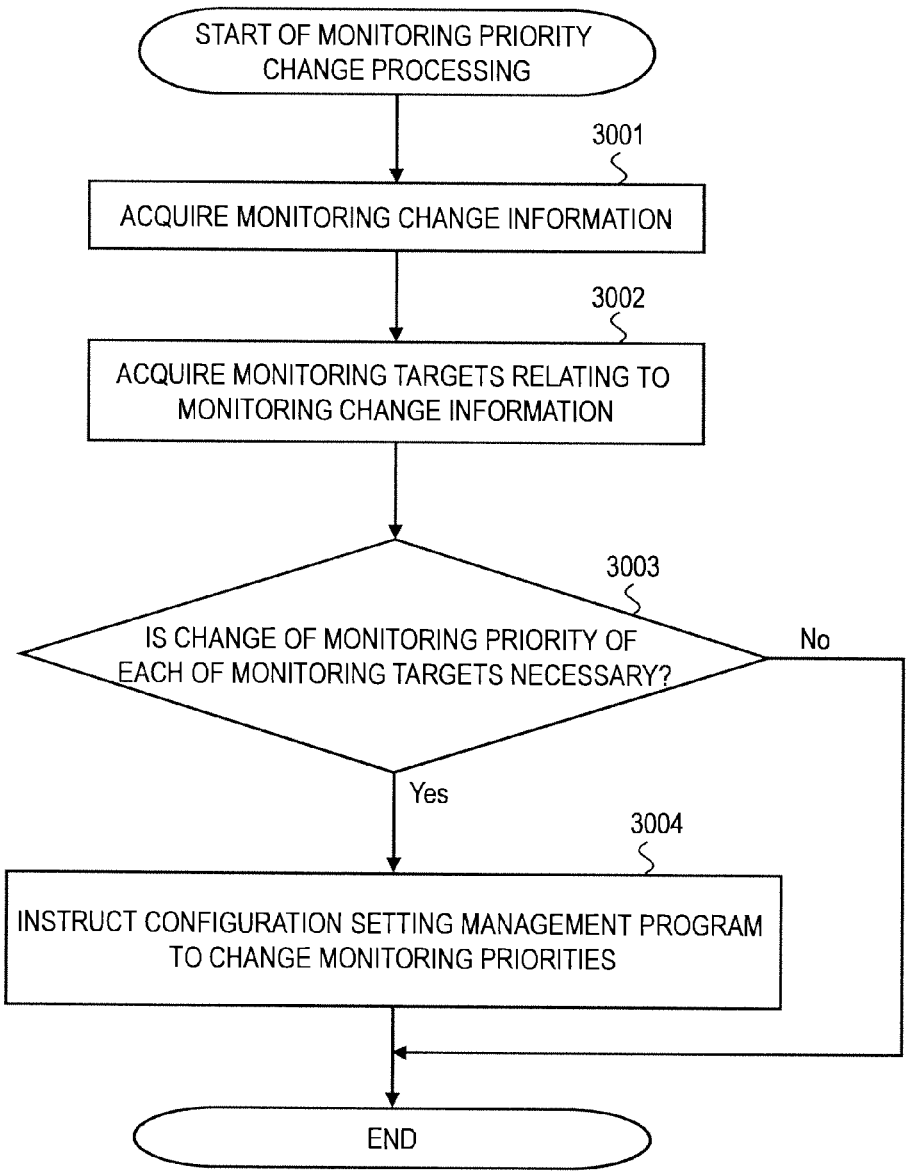
FIG. 12 is a flowchart illustrating a monitoring priority change processing executed by the management server according to the first embodiment of this invention.

FIG. 12 is a flowchart illustrating the monitoring priority change processing executed by the management server 10000 according to the first embodiment of this invention.

The monitoring priority change processing is executed by the processor 15000 of the management server 10000 executing the monitoring priority management program 11100 loaded on the memory 11000.

The monitoring priority management program 11100 first acquires monitoring change information indicating necessity of a change of the monitoring priority 11432 (Step 3001). The monitoring priority management program 11100 acquires the monitoring change information from the storage apparatus 20000, the physical server 30000, and the like. The monitoring priority management program 11100 may acquire the monitoring change information at predetermined time intervals provided by an administrator or the like, or may acquire the monitoring change information according to an instruction from the user or the like.

The monitoring change information herein refers to information indicating a state of each of the resources, and is included in various types of configuration information stored in the configuration performance information repository 11500, a log generated during system management operations, or information included in the Syslog. The monitoring change information is accumulated in the storage apparatus 20000 and the physical server 30000, and holds, as an event, information on a configuration changed by a system management operation and the like.

According to the first embodiment of this invention, the monitoring change information includes events such as information indicating whether the power supply of the virtual server 31200A is on or off, and information indicating a change of a type of an application used by the business task program 31210 included in the virtual server 31200A.

In other words, the monitoring change information acquired in Step 3001 includes information corresponding to the rule 11421 in the monitoring priority rule table 11420 and information for identifying a resource on which an event indicated by the monitoring change information has occurred.

It should be noted that, in Step 3001, the monitoring priority management program 11100 may refer to the acquired monitoring change information, and may finish the processing illustrated in FIG. 12 in a case where information corresponding to the rule 11421 is not included.

After Step 3001, the monitoring priority management program 11100 identifies the relevant resource type 11423 from the information corresponding to the rule 11421 included in the acquired monitoring change information. The monitoring priority management program 11100 further identifies identifiers of monitoring targets 11431 in the monitoring priority table 11430 based on the identified relevant resource type 11423, the information for identifying the resource included in the acquired monitoring change information, and the configuration information table 11510 (Step 3002).

Specifically, in Step 3002, the monitoring priority management program 11100 identifies an identifier indicating the resource on which the event indicated by the monitoring change information has occurred from the acquired monitoring change information. The monitoring priority management program 11100 refers to the configuration information table 11510 by the identifier indicating the resource on which the event has occurred. Then, the monitoring priority management program 11100 identifies which row (i.e., I/O path between the physical server 30000 and the physical disk 22200) the resource is included.

On the other hand, the monitoring priority management program 11100 identifies a rule 11421 corresponding to the event that has occurred from the monitoring priority rule table 11420 based on the acquired monitoring change information. The monitoring priority management program 11100 then identifies the relevant resource type 11423 from the identified rule 11421.

The monitoring priority management program 11100 then selects at least one resource corresponding to the identified relevant resource type 11423 from among the identified rows of the configuration information table 11510. The monitoring priority management program 11100 then identifies at least one monitoring target 11431 corresponding to each of the selected resources from the monitoring priority table 11430.

After Step 3002, the monitoring priority management program 11100 determines whether the monitoring priority 11432 of the resource of each of the monitoring targets 11431 needs to be changed based on the acquired monitoring change information, the information included in the monitoring priority rule table 11420, and the monitoring priority 11432 of each of the identified monitoring targets 11431 (Step 3003).

Specifically, in Step 3003, the monitoring priority management program 11100 selects any one of the monitoring priorities from the state for each monitoring priority 11422 based on the event included in the monitoring change information and the rule 11421 identified in Step 3001.

The monitoring priority management program 11100 then compares the monitoring priority 11432 corresponding to each of the monitoring targets 11431 identified in Step 3002, and the monitoring priority selected from the state for each monitoring priority 11422. As a result of the comparison, in a case where there is a monitoring target 11431 for which the monitoring priority 11432 and the monitoring priority identified from the state for each monitoring priority 11422 are different from each other, the monitoring priority management program 11100 determines that the monitoring priority 11432 of the monitoring target 11431 having the different monitoring priorities needs to be changed.

In a case where the monitoring priority management program 11100 determines that the monitoring priorities 11432 of all the monitoring targets 11431 do not need to be changed in Step 3003, the monitoring priority management program 11100 finishes the monitoring priority change processing.

In a case where the monitoring priority management program 11100 determines that a monitoring target 11431 for which the monitoring priority 11432 needs to be changed is present in Step 3003, the monitoring priority management program 11100 transmits a request (monitoring priority change request) to instruct the configuration setting management program 11200 to change the monitoring priority 11432 based on the information in the monitoring priority rule table 11420 (Step 3004).

Specifically, the monitoring priority management program 11100 transmits, to the configuration setting management program 11200, a monitoring priority change request including the identifier of the monitoring target 11431 for which it is determined in Step 3003 that the monitoring priority 11432 needs to be changed and the monitoring priority identified from the monitoring priority rule table 11420 in Step 3003.

In a case where an event involving changes of the monitoring priority 11432 has occurred by the above-mentioned monitoring priority change processing, the configuration setting management program 11200 is called to execute the processing (monitoring priority table change processing) of changing the monitoring priority of the resources to be monitored.

The management server 10000 according to this embodiment can change the monitoring priority 11432 by the monitoring priority change processing illustrated in FIG. 12 according to the monitoring change information indicating the change in the state of the virtual server 31200 and the like. Moreover, particularly in Steps 3002 and 3003, the monitoring target 11431 for changing the monitoring priority 11432 can be dynamically determined.

It should be noted that, though the management server 10000 acquires the monitoring change information from the physical server 30000 or the storage apparatus 20000 in Step 3001 described above, the management server 10000 according to this embodiment may receive the monitoring change information transmitted from the physical server 30000 or the storage apparatus 20000 as an event.

Moreover, the configuration information table 11510 used in Step 3002 may be updated by the configuration setting management program 11200. Specifically, the configuration setting management program 11200 may collect configuration information from each of resources included in the storage system according to this embodiment periodically or in response to an instruction by the user.

Figure 13:
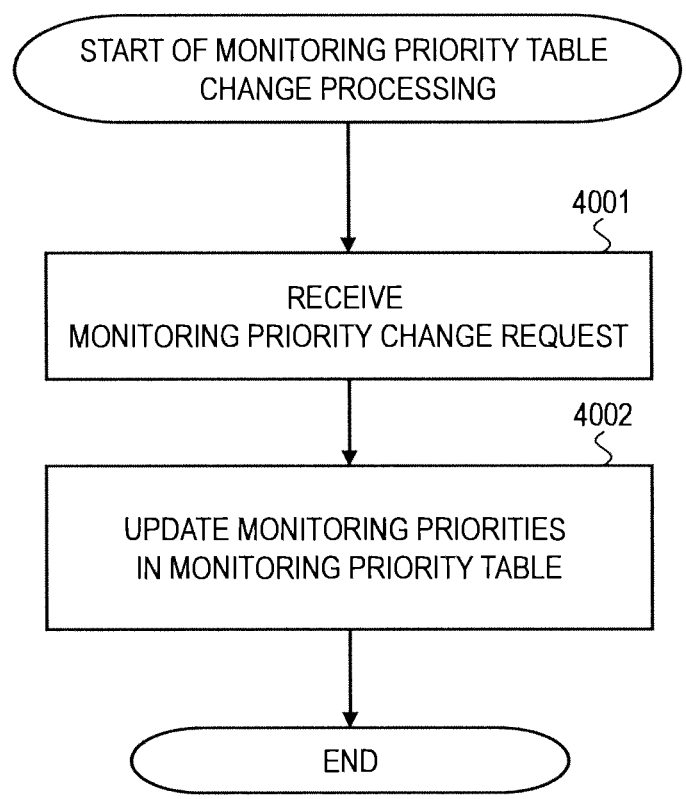
FIG. 13 is a flowchart illustrating a monitoring priority table change processing executed by the management server according to the first embodiment of this invention.

FIG. 13 is a flowchart illustrating the monitoring priority table change processing executed by the management server 10000 according to the first embodiment of this invention.

The monitoring priority table change processing is executed by the processor 15000 of the management server 10000 executing the configuration setting management program 11200 loaded on the memory 11000.

The configuration setting management program 11200 first receives the monitoring priority change request from the monitoring priority management program 11100 (Step 4001). After Step 4001, the configuration setting management program 11200 changes the monitoring priorities 11432 of corresponding monitoring targets 11431 based on the identifiers of the monitoring targets 11431 and the monitoring priorities, which are included in the monitoring priority change request (Step 4002).

In a case where an event involving changes of the monitoring priority has occurred by the above-mentioned monitoring priority table change processing, the configuration setting management program 11200 changes the monitoring priorities 11432.

A description is now given of an example of the processing of changing the monitoring priority 11432 according to the first embodiment of this invention.

When the power supply of the virtual server 31200A is switched from on to off, the monitoring priority change processing illustrated in FIG. 12 starts. The monitoring priority management program 11100 acquires an event indicating that the power supply of the virtual server 31200A is switched from on to off from the Syslog or the like. The monitoring priority management program 11100 then identifies resources (physical server, virtual server, server data I/F, storage data I/F, logical volume, and physical disk illustrated in FIG. 6) and the monitoring priority ("LOW" illustrated in FIG. 6) relating to the acquired event from the monitoring priority rule table 11420. On this occasion, the Syslog information may be stored in the configuration performance information repository 11500, or the system according to this embodiment may include another management server for managing the Syslog information.

The monitoring priority management program 11100 then refers to information in the configuration information table 11510, and identifies identifiers of the resources (physical server 30000A, server data I/F 32000 (S1), storage data I/F 26000 (P1), logical volume 22100 (LV1), and physical disk 22200 (PD1)) which are present on the same I/O access path as the virtual server 31200A, and correspond to the types of resource identified based on the monitoring priority rule table 11420. The monitoring priority management program 11100 then identifies monitoring targets 11431 corresponding to the identifiers of the identified resources.

The monitoring priority management program 11100 then compares the monitoring priority 11432 of the identified monitoring targets 11431 and the monitoring priority of "LOW" identified based on the monitoring priority rule table 11420 to each other, and selects monitoring targets 11431 which do not have the monitoring priority 11432 of "LOW".

The configuration setting management program then updates the monitoring priority 11432 of the selected monitoring targets 11431 to "LOW".

In the case of the above-mentioned example, the monitoring priority 11432 of the physical server 30000A, the server data I/F 32000 (S1), the storage data I/F 26000 (P1), the logical volume 22100 (LV1), and the physical disk 22200 (PD1) of FIG. 8 is changed from "HIGH" to "LOW".

It should be noted that the description has been given above of the case in which the event corresponding to "VIRTUAL SERVER POWER SUPPLY ON/OFF", which is the rule 11421, is included in the monitoring change information. However, the monitoring change information may include an event corresponding to "I/O PATH FAILURE (REDUNDANCY CHANGE)" or "BUSINESS TASK APPLICATION TYPE CHANGE", which is the rule 11421, for example.

Moreover, the monitoring change information may include an event indicating "SUSPENSION OF POWER SUPPLY OF VIRTUAL SERVER 31200".

FIG. 14 is a flowchart illustrating performance information collection processing executed by the management server 10000 according to the first embodiment of this invention.

The update processing of the performance information table 11520 (performance information processing collection processing) is executed by the processor 15000 of the management server 10000 executing the performance information collection program 11300 loaded on the memory 11000. The performance information collection processing starts after the monitoring priority type setting processing illustrated in FIG. 10 is executed and the monitoring priority table change processing illustrated in FIG. 13 is finished.

The performance information collection program 11300 first acquires information on the configuration information table 11510 and the monitoring priority table 11430, thereby acquiring monitoring targets 11431 for which performance information is to be collected and the monitoring priority 11432 of each of the monitoring targets 11431 (Step 5001). The performance information collection program 11300 may collect performance information for each of the I/O paths by referring to the configuration information table 11510.

After Step 5001, the performance information collection program 11300 collects the performance information on a device indicated by each of the monitoring targets 11431 at the acquired monitoring priority 11432 and by a monitoring method indicated by the monitoring priority type 11411 (Step 5002).

Specifically, in Step 5002, the performance information collection program 11300 refers to the monitoring priority type 11411 instructed by the monitoring priority type setting processing, thereby acquiring the collection interval and the collection items of each of the monitoring priorities 11412. The performance information collection program 11300 then acquires the performance information on the monitoring targets 11431 in the monitoring priority table 11430 at the collection interval and for the collection items of the monitoring priority 11412 corresponding to the monitoring priority 11432.

After Step 5002, the performance information collection program 11300 determines whether the collection of the performance information of the monitoring targets 11431 for the collection items indicated by the monitoring priority type 11411 at the collection interval indicated by the monitoring priority type 11411 is complete (Step 5003).

In a case where the collection of the performance information is not complete in the collection interval indicated by the monitoring priority type 11411, it is not possible to normally collect the performance information based on the monitoring priority type 11411 specified by the monitoring priority type setting processing of FIG. 10. Therefore, the performance information collection program 11300 proceeds to Step 5005.

In a case where the collection of the performance information is complete in the collection interval indicated by the monitoring priority type 11411, and the collected performance information is normally stored in the storage device 12000 of the management server 10000, it is possible to normally collect the performance information based on the monitoring priority type 11411 specified by the monitoring priority type setting processing of FIG. 10. Therefore, the performance information collection program 11300 proceeds to Step 5004.

After Step 5003, the performance information collection program 11300 stores the collected performance information in the performance information table 11520 (Step 5004), and finishes the performance information collection processing.

Moreover, after Step 5003, the performance information collection program 11300 continuously collects the performance information until the collection of the performance information is complete, and stores the collected performance information in the performance information table 11520 (Step 5005).

After Step 5005, the performance information collection program 11300 presents, to the user, the failure in the collection of the performance information as defined by the monitoring priority type 11411 specified by the monitoring priority type setting processing (Step 5006).

Specifically, in Step 5006, the performance information collection program 11300 presents the collection interval and the collection items at/for which the performance information cannot be collected to the user via the output device 14000, and presents the monitoring priority type 11411 including the collection interval at which it is expected that the performance information be collected (time taken until the collection is completed in Step 5005) among the monitoring priority types 11411 for collecting the same collection items to the user. Moreover, the performance information collection program 11300 may present proposals of a change of the monitoring priority type 11411, a change of the monitoring priority 11412, and a change of the number of the management servers 10000 to the user.

It should be noted that, in Step 5003, the performance information collection program 11300 may determine that the performance information cannot be normally collected in a case where the quantity of the collected performance information is large, and the storage device 12000 of the management server 10000 and the like become insufficient, and may thus proceed to Step 5006.

A first monitoring method of the storage system according to the first embodiment is determined by the monitoring priority type setting processing of FIG. 10 and the monitoring priority customization processing of FIG. 11. Then, in a case where a configuration change or the like has occurred in each of the resources included in the storage system according to the first embodiment, the monitoring priority 11432 is automatically changed by the processing illustrated in FIG. 12. Moreover, the monitoring method can be changed by the processing of FIGS. 10 and 11 at any time.

Further, after the monitoring priority type setting processing of FIG. 10 and the monitoring priority customization processing of FIG. 11, it is possible to determine whether or not the performance information can be collected by carrying out the performance information collection processing of FIG. 14, and thus to prompt the user to change the monitoring method, the monitoring priority 11432, and the like.

According to the first embodiment, in a case where a configuration change or the like has occurred in each of the resources included in the storage system according to the first embodiment, the monitoring priority 11432 is changed according to events and the like that have occurred by operations for the change, and monitoring targets 11431 are dynamically determined. Moreover, information quantity (corresponding to the collection items) and collection timing (corresponding to the collection interval) of the performance information to be collected from the monitoring target 11431 are dynamically changed by the user specifying the monitoring priority type.

This enables to eliminate monitoring targets from which the performance information does not need to be collected, and collection of unnecessary performance information, thereby collecting important performance information preferentially. Further, this enables to reduce the risk leading to a delay in the detection of a sign of occurrence of a problem, analysis of causes of the problem, and solutions on an important monitoring target.

Moreover, the user can change the monitoring method and the monitoring priority by the processing illustrated in FIGS. 10, 11, and 14, and monitoring targets from which the performance information does not need to be collected and collection of unnecessary performance information can thus be eliminated.

[Second Embodiment]

A description is now given of a second embodiment of this invention. In the following description, differences from the first embodiment of this invention are described, and a description which is a duplication of that of the first embodiment is omitted as appropriate. The configuration of the management server 10000 according to the second embodiment is the same as the configuration of the management server 10000 according to the first embodiment illustrated in FIG. 2, and a description thereof is therefore omitted.

Figure 15:
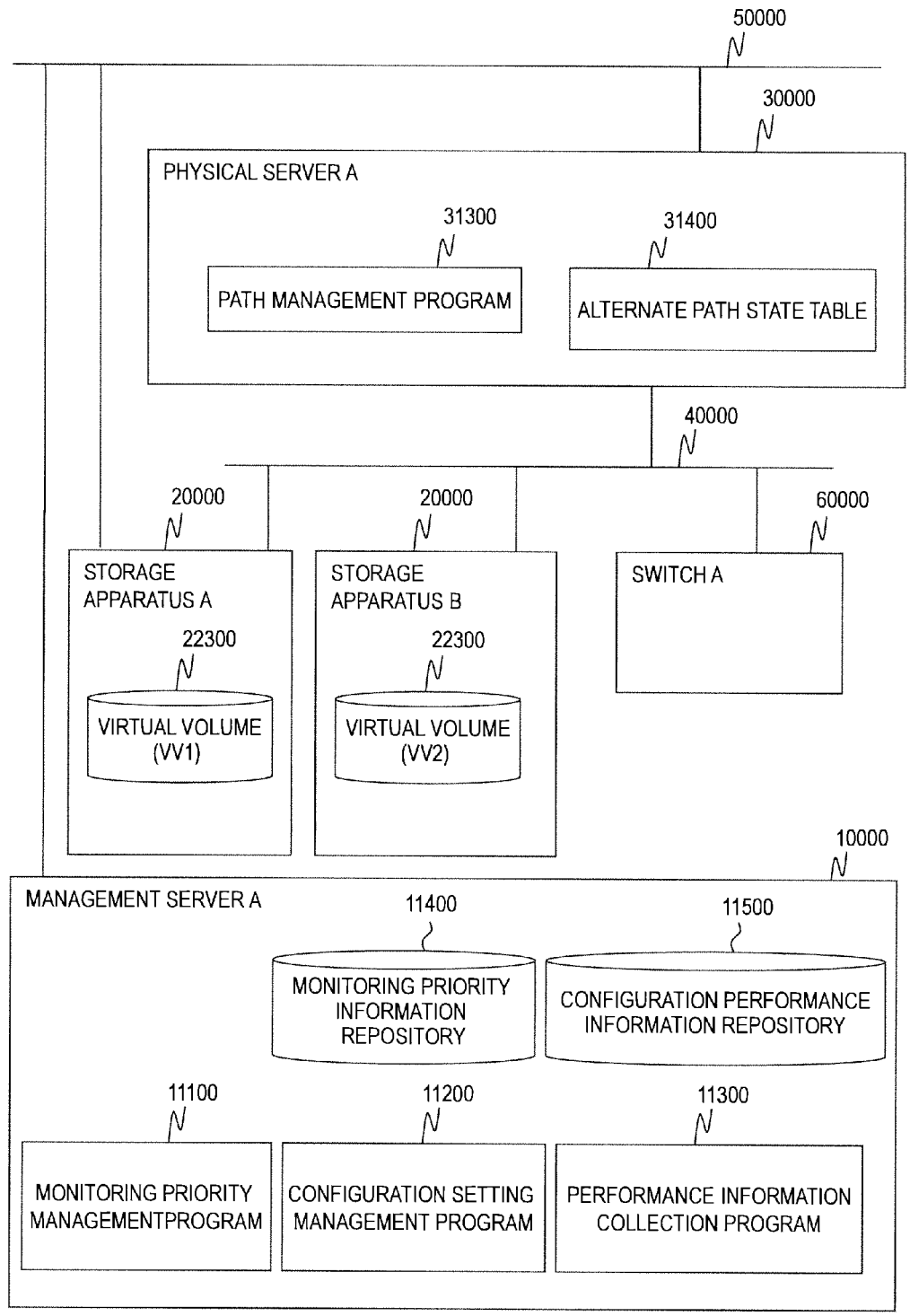
FIG. 15 is a block diagram illustrating a physical configuration of a storage system according to a second embodiment of this invention.

FIG. 15 is a block diagram illustrating a physical configuration of a storage system according to the second embodiment of this invention.

The storage system illustrated in FIG. 15 includes one or more switches 60000 in addition to the resources included in the storage system illustrated in FIG. 1. Couplings among the switch 60000, the storage apparatuses 20000, and the physical server 30000 are used for data communication, and a network for the data communication may therefore be used. The network may be an IP network, for example.

The storage apparatus 20000 according to the second embodiment includes a virtual volume 22300. Moreover, the physical server 30000 according to the second embodiment includes a path management program 31300 and an alternate path state table 31400.

A plurality of physical disks 22200 may be allocated to the virtual volume 22300 as in the case of the logical volume 22100 according to the first embodiment. Moreover, unlike the logical volume 22100 according to the first embodiment, the virtual volume 22300 may be provided to the physical server 30000 as an available volume even in a state in which a physical disk 22200 is not actually allocated, and a physical disk 22200 may be dynamically allocated when data is actually transmitted from the physical disk 22200.

Figure 17:
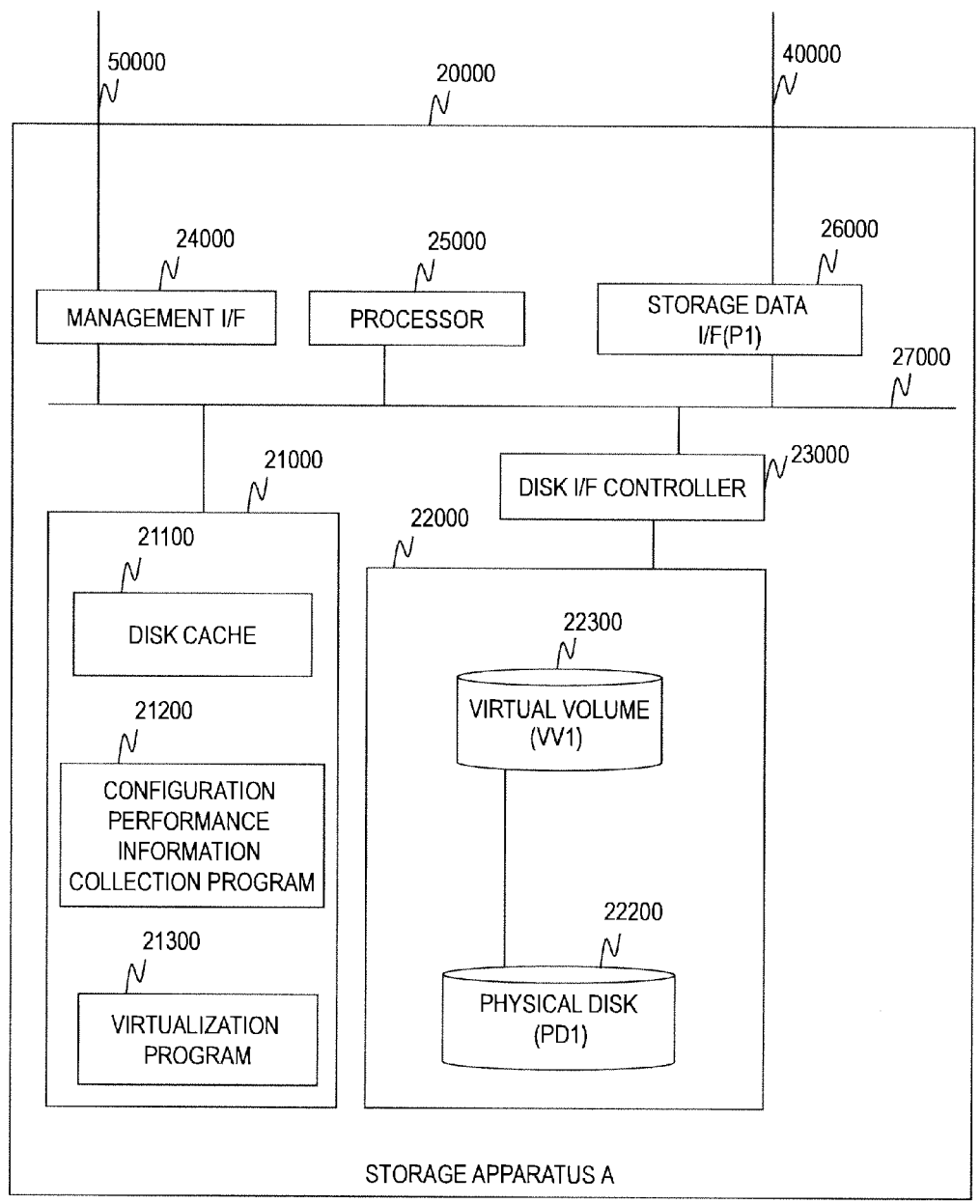
FIG. 17 is a block diagram illustrating a physical configuration of a storage apparatus according to the second embodiment of this invention.
Figure 18:
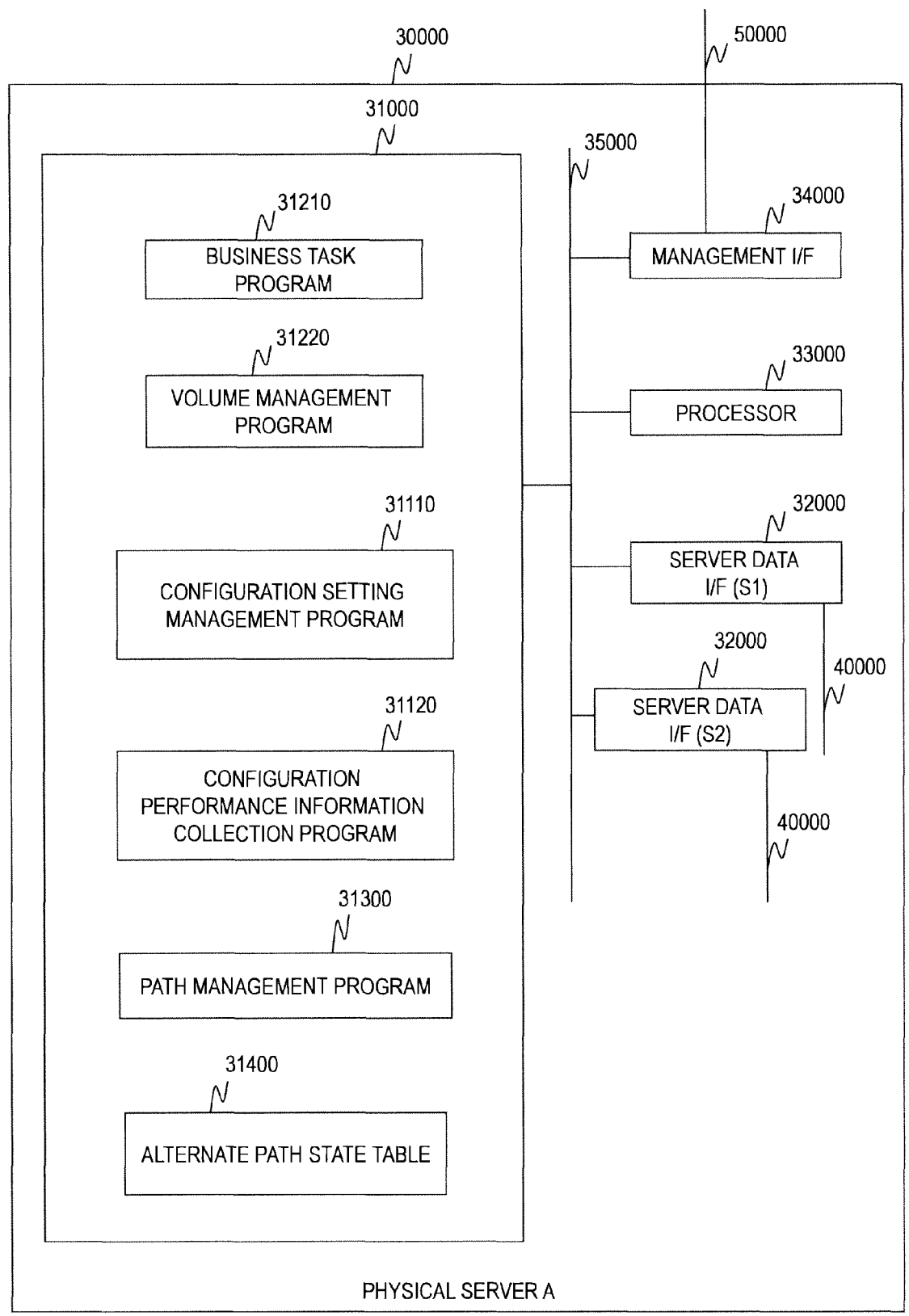
FIG. 18 is a block diagram illustrating a physical configuration of a physical server according to the second embodiment of this invention.

The storage apparatus 20000 and the physical server 30000 according to the second embodiment are respectively illustrated in FIGS. 17 and 18.

Figure 16:
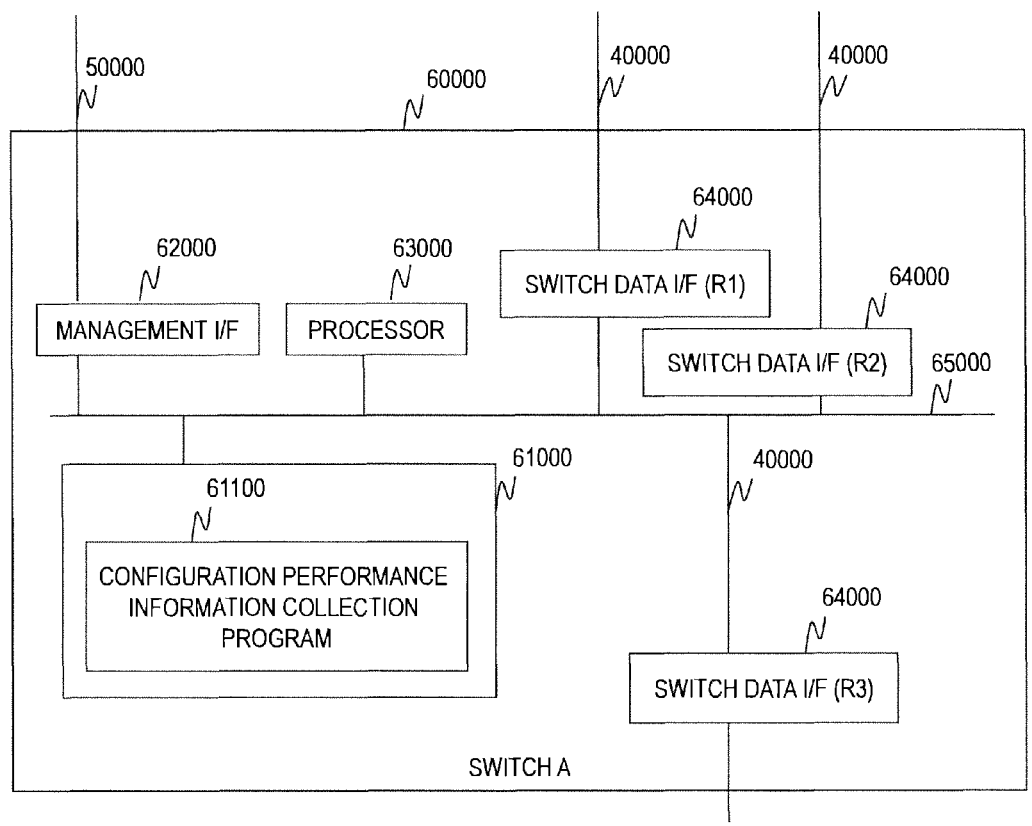
FIG. 16 is a block diagram illustrating a physical configuration of a switch according to the second embodiment of this invention.

FIG. 16 is a block diagram illustrating a physical configuration of the switch 60000 according to the second embodiment of this invention.

The switch 60000 includes a memory 61000, a management I/F 62000, a processor 63000, and switch data I/Fs 64000, and these devices are coupled to one another via an internal bus 65000. The switch 60000 is a device for selecting a communication path from the physical server 30000 to the virtual volume 22300.

A configuration performance information collection program 61100 is stored in the memory 61000. The configuration performance information collection program 61100 is a program for transmitting/receiving management information, performance information, and the like on the switch 60000 to/from the management server 10000.

The management I/F 62000, the processor 63000, and the switch data I/F 64000 according to the second embodiment are the physically same as the management I/F 24000, the processor 25000, and the storage data I/F 26000 according to the first embodiment.

FIG. 17 is a block diagram illustrating a physical configuration of the storage apparatus 20000 according to the second embodiment of this invention.

The storage apparatus 20000 according to the second embodiment illustrated in FIG. 17 includes, as in the case of the storage apparatus 20000 according to the first embodiment, the memory 21000, the logical volume providing section 22000, the disk I/F controller 23000, the management I/F 24000, the processor 25000, and the storage data I/F 26000.

However, the memory 21000 according to the second embodiment includes a virtualization program 21300. The logical volume providing section 22000 according to the second embodiment defines the virtual volume 22300 subject to the access from the physical server 30000, and provides a physical volume, which is an entity of the virtual volume 22300, to the virtual volume from a storage device in the storage apparatus 20000 or a storage device outside the storage apparatus 20000.

A virtual volume 22300 (VV1) of the storage apparatus 20000A and a virtual volume 22300 (VV2) of the storage apparatus 20000B are mapped to the physical server 30000A according to the second embodiment.

An I/O from the physical server 30000A to the virtual volume 22300 (VV1) is transmitted via the fibre channel 40000 to the virtual volume (VV1). The I/O from the physical server 30000A is transmitted to the physical disk 22200 included in the physical storage area of the storage apparatus 20000 and corresponding to the virtual volume 22300 (VV1).

It should be noted that the physical storage area mapped to the virtual volume 22300 (VV1) may be present on another storage apparatus 20000 outside the storage apparatus 20000 on which the virtual volume 22300 is present. Moreover, in a case where the logical volume providing section 22000 provides the logical volume 22100 as in the first embodiment, the virtual volume 22300 may be generated as a set of the logical volumes 22100.

FIG. 18 is a block diagram illustrating a physical configuration of the physical server 30000 according to the second embodiment of this invention.

The physical server 30000 according to the second embodiment includes, as in the case of the physical server 30000 according to the first embodiment, the memory 31000, the server data I/Fs 32000, the processor 33000, and the management I/F 34000.

However, the memory 31000 according to the second embodiment includes the alternate path state table 31400. In a case where a failure or the like has occurred on the SAN according to this embodiment, a volume such as the virtual volume 22300 subject to the access from the physical server 30000 and the I/O path are switched. The alternate path state table 31400 includes identifiers indicating volumes before and after the switching, which are used for switching the volume, the I/O path, and the like.

The case in which the volume and the I/O path are switched includes a case in which a failure has occurred in each of the physical disks 22200, and a case in which an imbalance in resources has occurred among a plurality of storage apparatuses 20000 or monitoring targets provided on a plurality of I/O paths. The alternate path state table 31400 according to the second embodiment includes the virtual volume 22300 (VV1) of the storage apparatus 20000A as the volume before the switching and the virtual volume 22300 (VV2) of the storage apparatus 20000B as the volume after the switching.

Moreover, the memory 31000 according to the second embodiment includes the path management program 31300. The path management program 31300 is a program which, in a case where a failure has occurred on a network or in other such cases, detects the failure or the like, and switches a transmission destination of an I/O from the storage apparatus 20000A to the storage apparatus 20000B, for example, without affecting the operation of the business task program 31210 on the physical server 30000A.

The failures and the like detected by the path management program 31300 include a case in which the communication between the physical server 30000A and the storage apparatus 20000A is not available due to a failure of the network, a case in which the storage apparatus 20000A stops due to a failure in the storage apparatus 20000A, and a case in which resources to be monitored in the storage apparatus 20000A or on the I/O path to the storage apparatus 20000A become insufficient.

The path management program 31300 controls a switching destination volume to take over INQUIRY information (including a product number and a volume name of the storage apparatus 20000, and the like) of a switching source volume, in order to control, for example, alternate path software, namely software for selecting any one of redundant paths to be used, to recognize that the switching source volume and the switching destination volume are the same. Moreover, in a case where zoning is set on the switch 60000 in the SAN, the path management program 31300 changes the set zoning.

Though the above-mentioned path management program 31300 switches the path by means of the takeover of the INQUIRY information and the zoning of the switch 60000, the method used by the path management program 31300 according to this embodiment is not limited to the method described above. For example, the path management program 31300 may control the alternate path software to transparently change the physical port (storage data I/F 26000) of the coupling destination by controlling a storage data I/F 26000 after the switching to take over the WORLD WIDE NAME of a storage data I/F 26000 before the switching, for example, without changing the zoning of the switch 60000.

FIG. 19 is an explanatory diagram illustrating the alternate path state table 31400 according to the second embodiment of this invention.

The alternate path state table 31400 includes volume identifiers 31410, server data I/Fs 31420, switch data I/Fs 31430, storage data I/Fs 31440, virtual volumes 31450, physical disks 31460, and path states 31470.

The volume identifier 31410 stores an identifier for uniquely identifying a volume on a storage apparatus 20000 to be recognized by the physical server 30000. The switch data I/F 31430 stores an identifier for uniquely indicating a switch data I/F 64000. The virtual volume 31450 stores an identifier for uniquely indicating a virtual volume 22300.

The path state 31470 stores a value indicating a path state, and is updated whenever an actually used path is changed. The path state 31470 stores a value indicating "MAIN" or "SUB". "MAIN" indicates that the path indicated by a row including "MAIN" is an actually used path, and "SUB" indicates that the path indicated by a row including "SUB" is not an actually used path.

The server data I/F 31420, the storage data I/F 31440, and the physical disk 31460 are the same as the server data I/F 11513, the storage data I/F 11514, and the physical disk 11516 of the configuration information table 11510 according to the first embodiment.

According to the alternate path state table 31400 illustrated in FIG. 19, in a case where an I/O access is made from the business task program 31210 included in the physical server 30000 to a volume having the volume identifier 31410 indicating "VOLUME 1", the I/O is transmitted to the virtual volume 22300 (VV1) indicated by the virtual volume 31450 in the row storing "MAIN" in the path state 31470 of the alternate path state table 31400. Then, the virtual volume 22300 (VV2) indicated by the virtual volume 31450 in the row storing "SUB" in the path state 31470 is an alternate path.

On this occasion, though the volume identifier 31410, the server data I/F 31420, the switch data I/F 31430, the storage data I/F 31440, the virtual volume 31450, and the physical disk 31460 are included as the I/O path for the access from the physical server 30000 in the alternate path state table 31400, the alternate path state table 31400 according to this embodiment is not limited thereto, and includes information on devices and the like.

For example, information on the logical volume 22100 or the application (such as database management system (DBMS)) used by the business task program 31210 on the physical server 30000 may be stored in the alternate path state table 31400 in association.

The configuration information table 11510 according to the second embodiment includes the same contents as the alternate path state table 31400. Each of the physical servers 30000 may transmit each of the rows in the alternate path state table 31400 to the management server 10000 periodically or in response to an instruction by the user or the like, and the management server 10000 may store each of the rows of the alternate path state table 31400 transmitted from each of the physical servers 30000 along with a transmitted identifier indicating the physical server 30000 in the configuration information table 11510.

Moreover, the configuration information table 11510 according to the second embodiment may store information on the alternate path state table 31400 collected from each of the physical servers 30000 included in the storage system according to this embodiment by the configuration setting management program 11200 periodically or in response to an instruction by the user.

It should be noted that, on this occasion, the physical server 30000 includes the path management program 31300 and the alternate path state table 31400, but the path management program 31300 and the alternate path state table 31400 according to this embodiment are not limited thereto. For example, the management server 10000 or the storage apparatus 20000 may include the above-mentioned program and table, or another device such as the switch 60000 provided between the respective devices may include the above-mentioned program.

Figure 20:
FIG. 20 is an explanatory diagram illustrating a monitoring priority table according to the second embodiment of this invention.

FIG. 20 is an explanatory diagram illustrating the monitoring priority table 11430 according to the second embodiment of this invention.

The monitoring priority table 11430 according to the second embodiment includes the monitoring targets 11431 and the monitoring priorities 11432 as in the case of the monitoring priority table 11430 according to the first embodiment.

The monitoring priority table 11430 according to the second embodiment includes the volume 1, the server data I/F 32000 (S1), the switch data I/F 64000 (R1), the switch data I/F 64000 (R2), the storage data I/F 26000A (P1), the virtual volume 22300 (VV1), and the physical disk 22200 (PD1) in the monitoring targets 11431, and these devices are arranged on the I/O path through which a write from the physical server 30000 to the volume 1 is actually performed. Therefore, the value indicating "HIGH" is stored in the monitoring priorities 11432.

On the other hand, a switch data I/F 64000 (R3), a storage data I/F 26000B (P2), the virtual volume 22300 (VV2), and the physical disk 22200 (PD2) included in the monitoring targets 11431 are arranged on an I/O path for the alternate path. Therefore, the value indicating "LOW" is stored in the monitoring priorities 11432.

Figure 21:
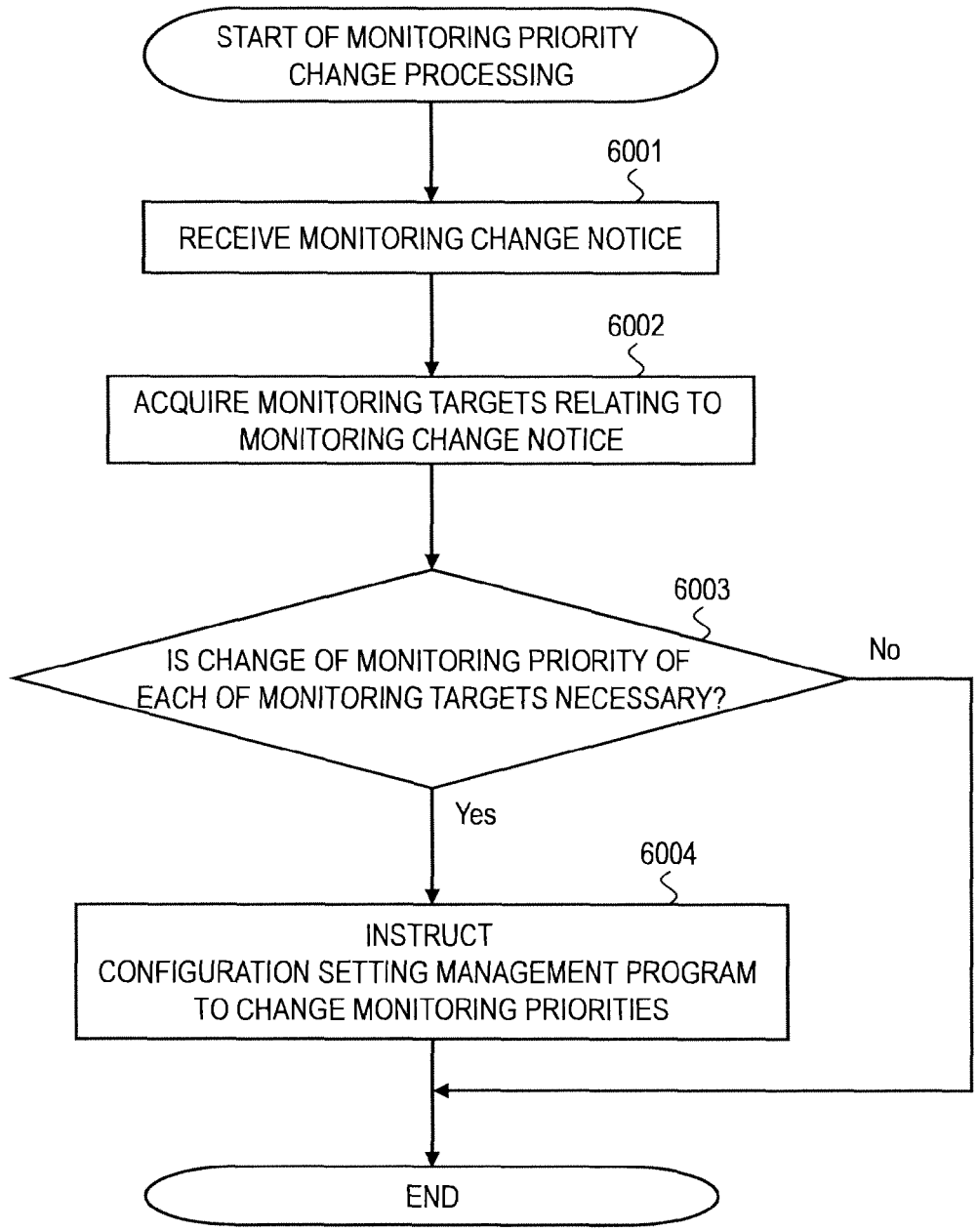
FIG. 21 is a flowchart illustrating a monitoring priority change processing executed by the management server according to the second embodiment of this invention.

FIG. 21 is a flowchart illustrating the monitoring priority change processing executed by the management server 10000 according to the second embodiment of this invention.

The monitoring priority change processing according to the second embodiment is executed by the processor 15000 of the management server 10000 executing the monitoring priority management program 11100 loaded on the memory 11000.

The monitoring priority management program 11100 first acquires a monitoring change notice indicating necessity of a change of the monitoring priority 11432 (Step 6001). On this occasion, the monitoring change notice includes information on an event indicating, for example, a configuration change in the SAN configuration, a performance degradation in each of the resources, or a failure which has occurred on each of the resources.

The monitoring change notice may be an SNMP trap for noticing occurrence of a configuration change or a failure on the storage apparatus 20000, for example. Moreover, the monitoring change notice may be an Indication message transmitted as a result of setting in advance by the user or the like so as to be noticed when the performance degrades or the failure has occurred.

The monitoring change notice according to the second embodiment includes a monitoring change notice indicating that, on an I/O path on which an alternate path is implemented, a physical I/O path for the physical server 30000 to make access to a volume recognized by the physical server 30000 is switched to the alternate path (hereinafter, referred to as "switch of the volume path"). For this purpose, the monitoring priority management program 11100 starts Step 6001.

It should be noted that an event indicating the switch of the volume path occurs along with a failure or a configuration change of the storage apparatus 20000.

It should be noted that, in Step 6001, the monitoring priority management program 11100 may refer to the received monitoring change notice, and may finish the processing illustrated in FIG. 21 in a case where information corresponding to the rule 11421 is not included.

Moreover, the monitoring change notice according to the second embodiment includes information indicating switched I/O paths. In other words, the physical server 30000 which has transmitted the monitoring change notice indicating the switch of the volume path transmits, to the management server 10000, information indicating the I/O path changed from "SUB" to "MAIN" and the I/O path changed from "MAIN" to "SUB" as the path state 31470 in the alternate path state table 31400.

The information on the I/O path transmitted from the physical server 30000 to the management server 10000 may be an identifier indicating each of the resources on the I/O path or an identifier indicating the I/O path. In other words, the information may be any information as long as the transmitted information on the I/O path can identify a row in the configuration information table 11510.

Step 6002 after Step 6001 is the same as Step 3002. However, Step 6002 and Step 3002 are different from each other in that monitoring targets 11431 are acquired based on the monitoring change notice in Step 6002.

A description is now given of specific processing from Step 6002 to Step 6004.

After Step 6001, the monitoring priority management program 11100 acquires resource types relating to the switch of the volume path included in the acquired monitoring change notice from the relevant resource type 11423 of the monitoring priority rule table 11420, and further identifies identifiers of the monitoring targets 11431 in the monitoring priority table 11430 based on the acquired relevant resource type 11423 and the configuration information table 11510 (including the contents of the alternate path state table 31400) (Step 6002).

Specifically, in Step 6002, the monitoring priority management program 11100 identifies I/O paths on which the switch of the volume path has occurred from the acquired monitoring change notice. The identified I/O path are two I/O paths, that is, an I/O path which has been changed from "SUB" to "MAIN", and an I/O path which has been changed from "MAIN" to "SUB" in the second embodiment.

The monitoring priority management program 11100 then refers to the configuration information table 11510 according to information for identifying the two I/O paths on which the switch of the volume path has occurred. The information for identifying the two I/O paths is included in the acquired monitoring change notice, and includes the volume identifier 31410 of the alternate path state table 31400, for example. As a result, the monitoring priority management program 11100 identifies which rows (namely I/O paths between the physical server 30000 and the physical disk 22200) in the configuration information table 11510 (including the contents of the alternate path state table 31400) respectively include the two I/O paths on which the switch of the volume path has occurred.

On the other hand, the monitoring priority management program 11100 identifies a rule 11421 corresponding to the event that has occurred from the monitoring priority rule table 11420 based on the acquired monitoring change notice. The monitoring priority management program 11100 then identifies the relevant resource type 11423 from the identified rule 11421.

The rule 11421 identified in the second embodiment is "VOLUME PATH SWITCHING" of FIG. 6.

The monitoring priority management program 11100 then selects resources corresponding to the identified relevant resource type 11423 from among the identified rows of the configuration information table 11510. The monitoring priority management program 11100 then identifies a monitoring target 11431 corresponding to each of the selected resources from the monitoring priority table 11430.

After Step 6002, the monitoring priority management program 11100 determines whether the change of the monitoring priority 11432 of the resource of each of the monitoring targets 11431 is necessary based on the acquired monitoring change notice, the information included in the monitoring priority rule table 11420, and the monitoring priority 11432 of each of the identified monitoring targets 11431 (Step 6003).

Specifically, in Step 6003, the monitoring priority management program 11100 selects a monitoring priority of the state for each monitoring priority 11422 corresponding to each of the resources based on the event included in the monitoring change notice and the rule 11421 identified in Step 6001.

According to the second embodiment, "MIDDLE" is selected for the resources (monitoring target 11431) included in the I/O path changed from "MAIN" to "SUB", and "HIGH" is selected for the resources (monitoring target 11431) included in the I/O path changed from "SUB" to "MAIN".

The monitoring priority management program 11100 then compares the monitoring priority 11432 corresponding to each of the monitoring targets 11431 identified in Step 6002, and the monitoring priority selected from the state for each monitoring priority 11422. As a result of the comparison, in a case where there is a monitoring target 11431 for which the monitoring priority 11432 and the monitoring priority identified from the state for each monitoring priority 11422 are different from each other, the monitoring priority management program 11100 determines that the monitoring priority 11432 of the monitoring target 11431 having the different monitoring priorities needs to be changed.

In a case where the monitoring priority management program 11100 determines that the monitoring priorities 11432 of all the monitoring targets 11431 do not need to be changed in Step 6003, the monitoring priority management program 11100 finishes the monitoring priority change processing.

In a case where it is determined that a monitoring target 11431 for which the monitoring priority 11432 needs to be changed is present in Step 6003, the monitoring priority management program 11100 transmits a request (monitoring priority change request) to instruct the configuration setting management program 11200 to change the monitoring priority 11432 based on the information in the monitoring priority rule table 11420 (Step 6004).

Specifically, the monitoring priority management program 11100 transmits, to the configuration setting management program 11200, a monitoring priority change request including the identifier of the monitoring target 11431 for which it is determined in Step 6003 that the monitoring priority 11432 needs to be changed and the monitoring priority identified from the monitoring priority rule table 11420 in Step 6003.

The management server 10000 according to the second embodiment can change the monitoring priority 11432 by the monitoring priority change processing illustrated in FIG. 21 according to the monitoring change notice indicating the switch of the volume path and the like. Moreover, particularly in Steps 6002 and 6003, the monitoring target 11431 for changing the monitoring priority 11432 can be dynamically determined.

It should be noted that, though the management server 10000 receives the monitoring change notice from the physical server 30000 or the like in Step 6001 described above, the management server 10000 according to this embodiment may acquire the information indicated by the monitoring change notice as the monitoring change information from the physical server 30000 or the storage apparatus 20000.

Figure 22:
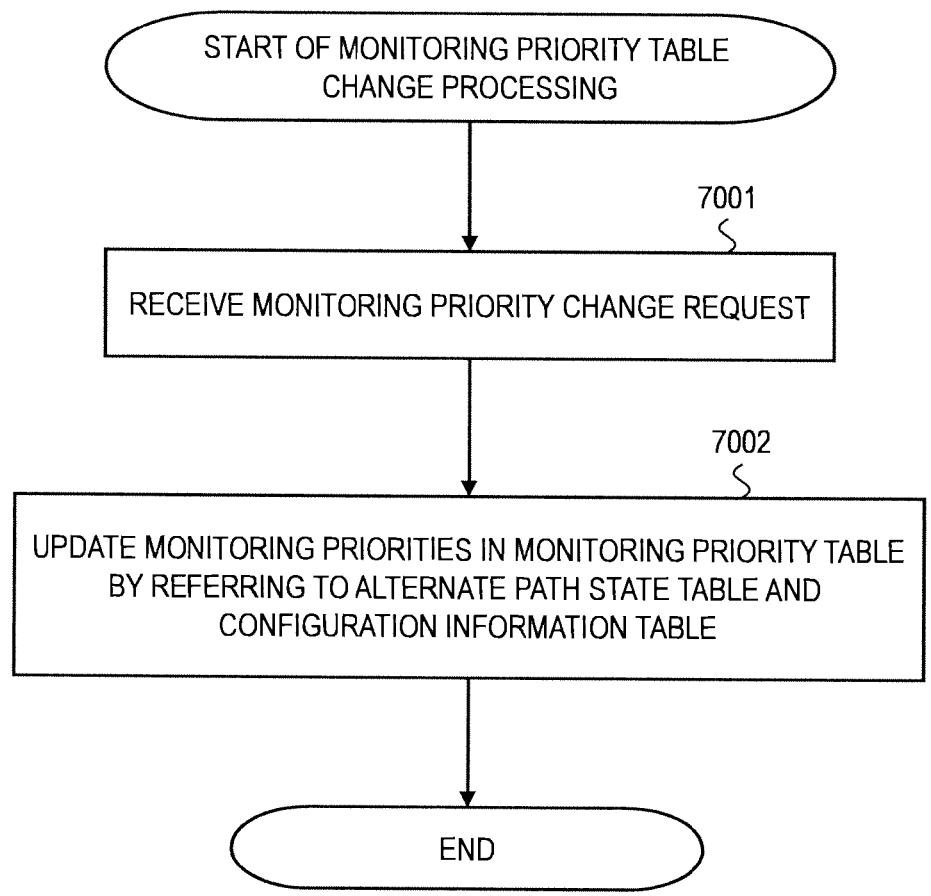
FIG. 22 is a flowchart illustrating a monitoring priority table change processing executed by the management server according to the second embodiment of this invention.

FIG. 22 is a flowchart illustrating the monitoring priority table change processing executed by the management server 10000 according to the second embodiment of this invention.

The monitoring priority table change processing is executed by the processor 15000 of the management server 10000 executing the configuration setting management program 11200 loaded on the memory 11000.

The configuration setting management program 11200 first receives the monitoring priority change request from the monitoring priority management program 11100 (Step 7001).

After Step 7001, the configuration setting management program 11200 refers to the information in the configuration information table 11510, and updates the monitoring priorities 11432 in the monitoring priority table 11430 according to contents of the change request (Step 7002). In a case where an event involving the change of the monitoring priorities 11432 has occurred, the monitoring priorities 11432 are change by the above-mentioned processing.

As a result of the occurrence of the event indicating the switch of the path along with a failure or a configuration change in the storage apparatus 20000, the switch data I/F 64000 (R3), the storage data I/F 26000B (P2), the virtual volume 22300 (VV2), and the physical disk 22200 (PD2) constitute a path (MAIN) used for write from the physical server 30000 by the monitoring priority table change processing. Therefore, the value indicating "HIGH" is stored in the monitoring priorities 11432 of the monitoring targets 11431 corresponding to the above-mentioned devices stored in the monitoring priority table 11430.

On the other hand, the switch data I/F 64000 (R2), the storage data I/F 26000A (P1), the virtual volume 22300 (VV1), and the physical disk 22200 (PD1) become resources included in the alternate path (SUB), and hence "MIDDLE" is stored in the monitoring priorities 11432 corresponding thereto by the monitoring priority table change processing.

According to the second embodiment of this invention, monitoring priorities 11432 can be immediately changed, and monitoring targets 11431 can be dynamically determined according to the functions of the storage apparatus 20000 and events such as a failure in the system. Moreover, the collection information and the collection interval from monitoring targets 11431 may be dynamically changed.

This enables to eliminate monitoring of monitoring targets which do not need to be monitored, and collection of unnecessary performance information, thereby collecting important performance information preferentially. Further, this enables to reduce the risk leading to a delay in the detection of a sign of occurrence of a problem, analysis of causes of the problem, and solutions on an important monitoring target.

It should be noted that, in the storage system according to this embodiment, the method according to the first embodiment and the method according to the second embodiment can be implemented by one storage system. In a case where the method according to the first embodiment and the method according to the second embodiment are implemented by one storage system, the configuration information table 11510 includes both the content of the configuration information table 11510 according to the first embodiment, and the content of the alternate path state table 31400 according to the second embodiment.

With the storage system according to this embodiment, the monitoring priorities can be automatically changed as described above even in a case where the configuration is changed in the storage system, and hence detection of occurrence of a problem or a sign of occurrence thereof, analysis thereof, and solutions thereto on an important monitoring target can be quickly performed.

While the present invention has been described in detail and pictorially in the accompanying drawings, the present invention is not limited to such detail but covers various obvious modifications and equivalent arrangements, which fall within the purview of the appended claims.

Industrial Applicability

This invention can be used for a monitoring management system in a complex storage system using virtual servers, virtual volumes, or the like.

What is claimed is:

1. A management computer coupled to a plurality of storage apparatuses and a plurality of physical computers coupled to each of the plurality of storage apparatuses, the management computer comprising:
   a memory for holding monitoring priority information including monitoring priority corresponding to an event which changes a configuration and setting and occurs on a path between each of the plurality of physical computers and each of the plurality of storage apparatuses, and configuration information including information indicating at least one resource included in the path;
   a processor configured to refer to the monitoring priority information and the configuration information; and
   a network interface configured to receive performance information on each of the at least one resource from the plurality of storage apparatuses or the plurality of physical computers,
   the management computer being configured to:
   collect the performance information on the each of the at least one resource included in the path based on the monitoring priority assigned to the each of the at least one resource;
   identify a first path including a first resource based on the configuration information in a case where a first event has occurred on the first resource;
   identify a second resource included in the first path;
   determine whether a third resource for which the monitoring priority needs to be changed is included in the second resource based on the first event and the monitoring priority information; and
   change the monitoring priority assigned to the third resource in a case where the third resource is determined to be included in the second resource.

2. The management computer according to claim 1, wherein:
   the monitoring priority information includes a value indicating the event, a value indicating the monitoring priority, and a value indicating a type of the at least one resource; and
   the management computer is further configured to:
   identify a type of the second resource affected by the first event based on the monitoring priority information; and
   identify the second resource by identifying the resource included in the first path, and corresponding to the identified type of the second resource.

3. The management computer according to claim 1, wherein:
   the first resource includes a virtual computer consist of a resource of each of the plurality of physical computers;
   the management computer is further configured to:
   change the monitoring priority assigned to the third resource to be decreased in a case where the first event is a stop or suspension of the virtual computer; and
   change the monitoring priority assigned to the third resource to be increased in a case where the first event is that the operation of the virtual computer starts.

4. The management computer according to claim 1, wherein:
   the first resource includes a primary path and a secondary path between each of the plurality of physical computers and each of the plurality of storage apparatuses; and
   the management computer is further configured to identify that the primary path and the secondary path are the first path in a case where the first event is that the path between the each of the plurality of physical computers and the each of the plurality of storage apparatuses switches from the primary path to the secondary path.

5. The management computer according to claim 1, wherein the management computer is further configured to:
   hold monitoring type information including the monitoring priority and a monitoring method for collecting the performance information from the each of the at least one resource;
   collect the performance information from the each of the at least one resource based on the monitoring priority information and the monitoring type information; and
   generate data for displaying a screen for changing the monitoring priority in a case where the performance information cannot be collected.

6. The management computer according to claim 5, wherein the management computer is further configured to generate data for displaying a screen for adding the monitoring method to the monitoring type information.

7. The management computer according to claim 5, wherein:
   the monitoring method includes an interval of times for collecting the performance information and an item of the performance information; and
   the management computer is further configured to collect the performance information from the each of the at least one resource included in the path based on the monitoring method corresponding to the monitoring priority assigned to each of the at least one resource.

8. A storage system management method by a management computer coupled to a plurality of storage apparatuses and a plurality of physical computers coupled to each of the plurality of storage apparatuses, the management computer including:
   a memory for holding monitoring priority information including monitoring priority corresponding to an event which changes a configuration and setting and occurs on a path between each of the plurality of physical computers and each of the plurality of storage apparatuses, and configuration information including information indicating at least one resource included in the path;
   a processor configured to refer to the monitoring priority information and the configuration information; and
   a network interface configured to receive performance information on each of the at least one resource from the plurality of storage apparatuses or the plurality of physical computers,
   the storage system management method comprising the steps of:
   collecting, by the management computer, the performance information on the each of the at least one resource included in the path based on the monitoring priority assigned to the each of the at least one resource;
   identifying, by the management computer, a first path including a first resource based on the configuration information in a case where a first event has occurred on the first resource;
   identifying, by the management computer, a second resource included in the first path;

determining, by the management computer, whether a third resource for which the monitoring priority needs to be changed is included in the second resource based on the first event and the monitoring priority information; and changing, by the management computer, the monitoring priority assigned to the third resource in a case where the third resource is determined to be included in the second resource.

9. The storage system management method according to claim 8, wherein:

the monitoring priority information includes a value indicating the event, the monitoring priority, and a value indicating a type of the at least one resource; and the step of identifying a second resource includes the steps of:

identifying, by the management computer, a type of the second resource affected by the first event based on the monitoring priority information; and identifying the second resource by identifying the resource included in the first path, and corresponding to the identified type of the second resource.

10. The storage system management method according to claim 8, wherein:

the first resource includes a virtual computer consist of a resource of each of the plurality of physical computers; and the step of changing the monitoring priority assigned to the third resource includes the steps of:

changing, by the management computer, the monitoring priority assigned to the third resource to be decreased in a case where the first event is a stop or suspension of the virtual computer; and changing, by the management computer, the monitoring priority assigned to the third resource to be increased in a case where the first event is that the operation of the virtual computer starts.

11. The storage system management method according to claim 8, wherein:

the first resource includes a primary path and a secondary path between each of the plurality of physical computers and each of the plurality of storage apparatuses; and the step of identifying a first path includes the step of identifying, by the management computer, that the primary path and the secondary path are the first path in a case where the first event is that the path between the each of the plurality of physical computers and the each of the plurality of storage apparatuses switches from the primary path to the secondary path.

12. The storage system management method according to claim 8, wherein:

the management computer holds monitoring type information including the monitoring priority and a monitoring method for collecting the performance information from the each of the at least one resource; and the step of collecting the performance information on the each of the at least one resource included in the path includes the steps of:

collecting, by the management computer, the performance information from the each of the at least one resource based on the monitoring priority information and the monitoring type information; and generating, by the management computer, data for displaying a screen for changing the monitoring priority in a case where the performance information cannot be collected.

13. The storage system management method according to claim 12, further including the step of generating, by the management computer, data for displaying a screen for adding the monitoring method to the monitoring type information.

14. The storage system management method according to claim 12, wherein:

the monitoring method includes an interval of times for collecting the performance information and an item of the performance information; and the step of collecting the performance information on the each of the at least one resource included in the path includes the step of collecting, by the management computer, the performance information from the each of the at least one resource included in the path based on the monitoring method corresponding to the monitoring priority assigned to the each of the at least one resource.

15. A storage system, comprising:

a plurality of storage apparatuses;

a plurality of physical computers coupled to each of the plurality of storage apparatuses; and a management computer coupled to the plurality of storage apparatuses and the plurality of physical computers, wherein:

the management computer includes:

a memory for holding monitoring priority information including monitoring priority corresponding to an event which changes a configuration and setting and occurs on a path between each of the plurality of physical computers and the each of the plurality of storage apparatuses, and configuration information including information indicating at least one resource included in the path;

a processor configured to refer to the monitoring priority information and the configuration information; and a network interface configured to receive performance information on each of the at least one resource from the plurality of storage apparatuses or the plurality of physical computers; and the management computer is configured to:

collect the performance information on the each of the at least one resource included in the path based on the monitoring priority assigned to the each of the at least one resource;

identify a first path including a first resource based on the configuration information in a case where a first event has occurred on the first resource;

identify a second resource included in the first path;

determine whether a third resource for which the monitoring priority needs to be changed is included in the second resource based on the first event and the monitoring priority information; and change the monitoring priority assigned to the third resource in a case where the third resource is determined to be included in the second resource.

* * * * *